(12) United States Patent
Burnett

(10) Patent No.: US 8,118,172 B2
(45) Date of Patent: Feb. 21, 2012

(54) SHALE SHAKERS WITH CARTRIDGE SCREEN ASSEMBLIES

(75) Inventor: George Alexander Burnett, Aberdeen (GB)

(73) Assignee: National Oilwell Varco L.P., Houston, TX (US)

( * ) Notice: Subject to any disclaimer, the term of this patent is extended or adjusted under 35 U.S.C. 154(b) by 576 days.

(21) Appl. No.: 12/287,716

(22) Filed: Oct. 10, 2008

(65) Prior Publication Data

US 2009/0120846 A1    May 14, 2009

Related U.S. Application Data

(63) Continuation-in-part of application No. 11/544,291, filed on Oct. 6, 2006, now abandoned, and a continuation-in-part of application No. 11/280,975, filed on Nov. 16, 2005, now abandoned, and a continuation-in-part of application No. 11/280,976, filed on Nov. 16, 2005, now abandoned.

(51) Int. Cl.
*B07B 1/00* (2006.01)
*B07B 1/34* (2006.01)
(52) U.S. Cl. ........ 209/325; 209/242; 209/255; 209/268; 209/269; 209/309
(58) Field of Classification Search ............. 209/242, 209/255, 268, 269, 309, 311, 312, 320, 322, 209/325
See application file for complete search history.

(56) References Cited

U.S. PATENT DOCUMENTS

| | | | |
|---|---|---|---|
| 420,428 A | 2/1890 | Baker | |
| 485,064 A | 10/1892 | Smith | |
| 1,886,174 A * | 11/1932 | Hazeltine et al. | 209/269 |
| 2,082,513 A | 6/1937 | Roberts | 210/76 |
| 2,112,784 A | 3/1938 | McNitt | 99/105 |
| 2,418,529 A | 4/1947 | Stern | 51/309 |
| 2,446,293 A | 8/1948 | Minyard | 210/403 |
| 3,012,674 A | 12/1961 | Hoppe | 209/401 |
| 3,064,806 A * | 11/1962 | Hukki | 209/17 |
| RE25,774 E | 5/1965 | Hukki | 209/17 |
| 3,302,720 A | 2/1967 | Brandon | 166/42 |
| 3,640,344 A | 2/1972 | Brandon | 166/307 |

(Continued)

FOREIGN PATENT DOCUMENTS

CH    656073    6/1986

(Continued)

OTHER PUBLICATIONS

U.S. Appl. No. 12/481,959 Final Office Action dated Oct. 27, 2010.

(Continued)

*Primary Examiner* — Terrell Matthews
(74) *Attorney, Agent, or Firm* — Williams, Morgan & Amerson, P.C.

(57) ABSTRACT

A screening apparatus for separating components of a material by vibratory separation which, in certain aspects, includes a vibratable box connected via vibration isolators within a container, the box including screening apparatus thereon or the vibratory separator having replaceable screening cartridges within a container. This abstract is provided to comply with the rules requiring an abstract which will allow a searcher or other reader to quickly ascertain the subject matter of the technical disclosure and is submitted with the understanding that it will not be used to interpret or limit the scope or meaning of the claims, 37 C.F.R. 1.72(b).

22 Claims, 21 Drawing Sheets

SCREEN AREA = 3.3 m2

U.S. PATENT DOCUMENTS

| | | | | |
|---|---|---|---|---|
| 3,743,094 A | 7/1973 | Mook | | 210/78 |
| 3,747,770 A | 7/1973 | Zentis | | 210/402 |
| 3,796,299 A | 3/1974 | Musschoot | | 198/220 |
| 3,855,380 A | 12/1974 | Gordon et al. | | 264/97 |
| 3,874,733 A | 4/1975 | Poundstone et al. | | 299/17 |
| 3,900,393 A | 8/1975 | Wilson | | 209/399 |
| 3,905,894 A | 9/1975 | Hukki | | 209/17 |
| 3,953,325 A | 4/1976 | Nelson | | 209/273 |
| 3,993,146 A | 11/1976 | Poundstone et al. | | 175/206 |
| 4,033,865 A | 7/1977 | Derrick, Jr. | | 209/275 |
| 4,038,152 A | 7/1977 | Atkins | | 201/2.5 |
| 4,222,988 A | 9/1980 | Barthel | | 422/309 |
| 4,233,181 A | 11/1980 | Goller et al. | | 252/425.3 |
| 4,306,974 A | 12/1981 | Harry | | 210/388 |
| 4,322,288 A * | 3/1982 | Schmidt | | 209/356 |
| 4,346,011 A | 8/1982 | Brownstein | | 210/748 |
| 4,385,891 A | 5/1983 | Ligotti | | 433/92 |
| 4,411,074 A | 10/1983 | Daly | | 34/32 |
| 4,459,207 A | 7/1984 | Young | | 209/269 |
| 4,482,459 A | 11/1984 | Shiver | | 210/639 |
| 4,526,687 A | 7/1985 | Nugent | | 210/202 |
| 4,575,336 A | 3/1986 | Mudd et al. | | 432/72 |
| 4,624,417 A | 11/1986 | Gangi | | 241/17 |
| 4,639,258 A | 1/1987 | Schellstede et al. | | 55/52 |
| 4,650,687 A | 3/1987 | Willard et al. | | 426/438 |
| 4,696,353 A | 9/1987 | Elmquist et al. | | 175/206 |
| 4,696,751 A | 9/1987 | Eifling | | 210/780 |
| 4,701,266 A | 10/1987 | Janka et al. | | 210/803 |
| 4,729,548 A | 3/1988 | Sullins | | 266/44 |
| 4,751,887 A | 6/1988 | Terry et al. | | 110/246 |
| 4,770,711 A | 9/1988 | Deal, III et al. | | 134/18 |
| 4,783,057 A | 11/1988 | Sullins | | 266/44 |
| 4,791,002 A | 12/1988 | Baker et al. | | 426/641 |
| 4,799,987 A | 1/1989 | Sullins | | 156/425 |
| 4,809,791 A | 3/1989 | Hayatdavoudi | | 175/40 |
| 4,832,853 A | 5/1989 | Shiraki et al. | | 210/781 |
| 4,844,106 A * | 7/1989 | Hunter et al. | | 134/73 |
| 4,889,733 A | 12/1989 | Willard et al. | | 426/438 |
| 4,889,737 A | 12/1989 | Willard et al. | | 426/550 |
| 4,895,665 A | 1/1990 | Colelli et al. | | 210/710 |
| 4,895,731 A | 1/1990 | Baker et al. | | 426/641 |
| 4,896,835 A | 1/1990 | Fahrenholz | | 241/74 |
| 4,915,452 A | 4/1990 | Dibble | | 299/17 |
| 4,940,535 A | 7/1990 | Fisher et al. | | 209/250 |
| 4,942,929 A | 7/1990 | Malachosky et al. | | 175/66 |
| 5,008,010 A | 4/1991 | Langner | | 210/232 |
| 5,009,795 A | 4/1991 | Eichler | | 210/744 |
| 5,053,082 A | 10/1991 | Flanigan et al. | | 134/25.1 |
| 5,066,350 A | 11/1991 | Sullins | | 156/187 |
| 5,080,721 A | 1/1992 | Flanigan et al. | | 134/26 |
| 5,107,874 A | 4/1992 | Flanigan et al. | | 134/60 |
| 5,109,933 A | 5/1992 | Jackson | | 175/66 |
| 5,129,469 A | 7/1992 | Jackson | | 175/66 |
| 5,145,256 A | 9/1992 | Wiemers et al. | | 366/336 |
| 5,181,578 A | 1/1993 | Lawler | | 175/424 |
| 5,190,645 A | 3/1993 | Burgess | | 210/144 |
| 5,200,372 A | 4/1993 | Kuroyama et al. | | 501/96 |
| 5,221,008 A | 6/1993 | Derrick, Jr. et al. | | 209/269 |
| 5,226,546 A | 7/1993 | Janssens | | 209/319 |
| 5,227,057 A | 7/1993 | Lundquist | | 210/174 |
| 5,253,718 A | 10/1993 | Lawler | | 175/20 |
| 5,314,058 A | 5/1994 | Graham | | 198/753 |
| 5,337,966 A | 8/1994 | Francis et al. | | 241/46.06 |
| 5,385,669 A | 1/1995 | Leone, Sr. | | 210/488 |
| 5,392,925 A | 2/1995 | Seyffert | | 209/405 |
| 5,454,957 A | 10/1995 | Roff | | 210/768 |
| 5,488,104 A | 1/1996 | Schulz | | 536/86 |
| 5,489,204 A | 2/1996 | Conwell et al. | | 432/153 |
| 5,516,348 A | 5/1996 | Conwell et al. | | 51/309 |
| 5,534,207 A | 7/1996 | Burrus | | 264/150 |
| 5,547,479 A | 8/1996 | Conwell et al. | | 51/309 |
| 5,566,889 A | 10/1996 | Preiss | | 241/19 |
| 5,567,150 A | 10/1996 | Conwell et al. | | 432/14 |
| 5,570,749 A | 11/1996 | Reed | | 175/66 |
| 5,593,582 A | 1/1997 | Roff, Jr. | | 210/325 |
| 5,595,654 A | 1/1997 | Caughman, Jr. | | 210/323.1 |
| 5,669,941 A | 9/1997 | Peterson | | 51/295 |
| 5,732,828 A | 3/1998 | Littlefield, Jr. | | 209/365.1 |
| 5,791,494 A | 8/1998 | Meyer | | 209/368 |
| 5,819,952 A | 10/1998 | Cook et al. | | 209/400 |
| 5,868,125 A | 2/1999 | Maoujoud | | 125/15 |
| 5,896,998 A | 4/1999 | Bjorklund et al. | | 209/326 |
| 5,944,197 A | 8/1999 | Baltzer et al. | | 209/400 |
| 5,947,299 A | 9/1999 | Vazquez et al. | | 209/157 |
| 5,971,307 A | 10/1999 | Davenport | | 241/259.1 |
| 6,004,461 A | 12/1999 | Harris | | 210/241 |
| 6,013,158 A | 1/2000 | Wootten | | 202/99 |
| 6,024,228 A * | 2/2000 | Williams | | 209/272 |
| 6,045,070 A | 4/2000 | Davenport | | 241/60 |
| 6,102,310 A | 8/2000 | Davenport | | 241/21 |
| 6,138,834 A | 10/2000 | Southall | | 209/17 |
| 6,155,428 A | 12/2000 | Bailey et al. | | 209/315 |
| 6,170,580 B1 | 1/2001 | Reddoch | | 175/66 |
| 6,217,757 B1 | 4/2001 | Fleischmann | | 210/163 |
| 6,223,906 B1 | 5/2001 | Williams | | 210/400 |
| 6,234,250 B1 | 5/2001 | Green et al. | | 166/250.03 |
| 6,244,362 B1 | 6/2001 | Williams | | 175/206 |
| 6,258,282 B1 | 7/2001 | Strid et al. | | 210/780 |
| 6,279,471 B1 | 8/2001 | Reddoch | | 100/37 |
| 6,283,302 B1 | 9/2001 | Schulte et al. | | 209/399 |
| 6,333,700 B1 | 12/2001 | Thomeer et al. | | 340/854.8 |
| 6,412,644 B1 | 7/2002 | Crabbe et al. | | 209/309 |
| 6,506,310 B2 | 1/2003 | Kulbeth | | 210/780 |
| 6,553,901 B2 | 4/2003 | Reddoch | | 100/45 |
| 6,662,952 B2 | 12/2003 | Adams et al. | | 209/319 |
| 6,669,027 B1 | 12/2003 | Mooney et al. | | 209/405 |
| 6,722,504 B2 | 4/2004 | Schulte et al. | | 209/359 |
| 6,763,605 B2 | 7/2004 | Reddoch | | 34/58 |
| 6,783,088 B1 | 8/2004 | Gillis et al. | | 241/19 |
| 6,793,814 B2 | 9/2004 | Fout et al. | | 210/188 |
| 6,863,183 B2 | 3/2005 | Schulte et al. | | 209/405 |
| 6,868,972 B2 | 3/2005 | Seyffert et al. | | 209/254 |
| 6,938,778 B2 | 9/2005 | Allaei | | 290/365.1 |
| 6,962,257 B2 | 11/2005 | Upchurch et al. | | 210/470 |
| 7,005,060 B2 | 2/2006 | Pitt et al. | | 210/163 |
| 7,093,678 B2 | 8/2006 | Risher et al. | | 175/66 |
| 7,195,084 B2 | 3/2007 | Burnett et al. | | 175/66 |
| 7,284,665 B2 | 10/2007 | Fuchs | | 209/270 |
| 7,303,079 B2 | 12/2007 | Reid-Robertson et al. | | 209/405 |
| 7,316,321 B2 | 1/2008 | Robertson et al. | | 209/400 |
| 7,373,996 B1 | 5/2008 | Martin et al. | | 175/206 |
| 7,514,011 B2 * | 4/2009 | Kulbeth | | 210/780 |
| 7,534,344 B2 | 5/2009 | Williamson et al. | | 210/170.03 |
| 7,581,569 B2 | 9/2009 | Beck | | 139/425 R |
| 7,770,665 B2 | 8/2010 | Eia et al. | | 175/66 |
| 2001/0032815 A1 | 10/2001 | Adams et al. | | 210/388 |
| 2002/0000399 A1 | 1/2002 | Winkler et al. | | 209/399 |
| 2002/0033278 A1 | 3/2002 | Reddoch | | 175/57 |
| 2002/0134709 A1 | 9/2002 | Riddle | | 209/238 |
| 2004/0040746 A1 | 3/2004 | Niedermayr et al. | | 175/38 |
| 2004/0051650 A1 | 3/2004 | Gonsoulin et al. | | 340/853.1 |
| 2004/0156920 A1 | 8/2004 | Kane | | 424/725 |
| 2004/0245155 A1 | 12/2004 | Strong et al. | | 209/405 |
| 2004/0251185 A1 | 12/2004 | Pitt et al. | | 210/163 |
| 2005/0236305 A1 | 10/2005 | Schulte, Jr. et al. | | 209/403 |
| 2006/0034988 A1 | 2/2006 | Bresnahan et al. | | 426/502 |
| 2006/0081508 A1 | 4/2006 | Astleford et al. | | 209/309 |
| 2006/0163147 A1 | 7/2006 | Dierkes et al. | | 210/446 |
| 2008/0078704 A1 | 4/2008 | Carr et al. | | 209/399 |
| 2008/0179090 A1 | 7/2008 | Eia et al. | | 175/5 |
| 2008/0179096 A1 | 7/2008 | Eia et al. | | 175/66 |
| 2008/0179097 A1 | 7/2008 | Eia et al. | | 175/66 |
| 2009/0286098 A1 | 11/2009 | Yajima et al. | | 428/507 |
| 2009/0316084 A1 | 12/2009 | Yajima et al. | | 349/96 |
| 2010/0084190 A1 | 4/2010 | Eia et al. | | 175/5 |
| 2010/0119570 A1 | 5/2010 | Potter et al. | | 424/422 |

FOREIGN PATENT DOCUMENTS

| | | |
|---|---|---|
| DE | 3821647 | 12/1989 |
| DE | 4127929 A1 | 2/1993 |
| EP | 0548729 | 6/1993 |
| FR | 2 611 559 | 9/1988 |
| FR | 2 636 669 | 3/1990 |
| GB | 327845 | 11/1929 |
| GB | 1245657 | 12/1968 |
| GB | 1440814 | 6/1976 |
| GB | 2 030 482 A | 4/1980 |

| | | |
|---|---|---|
| GB | 2 206501 | 7/1987 |
| GB | 2 327 442 A | 1/1999 |
| GB | 2 413097 | 8/2004 |
| JP | 55112761 | 8/1980 |
| JP | 59069268 | 4/1984 |
| JP | 63003090 | 1/1988 |
| JP | 63283860 | 11/1988 |
| JP | 63290705 | 11/1988 |
| JP | 02127030 | 5/1990 |
| JP | 02167834 | 6/1990 |
| JP | 03240925 | 10/1991 |
| JP | 03264263 | 11/1991 |
| JP | 04093045 | 3/1992 |
| JP | 04269170 | 9/1992 |
| JP | 05043884 | 2/1993 |
| JP | 05301158 | 11/1993 |
| JP | 06063499 | 3/1994 |
| JP | 07304028 | 11/1995 |
| JP | 08039428 | 2/1996 |
| JP | 08270355 | 10/1996 |
| JP | 09109032 | 4/1997 |
| WO | WO 97/03765 | 2/1997 |
| WO | WO 97/28906 | 8/1997 |
| WO | WO98/10895 | 3/1998 |
| WO | WO 98/16295 | 4/1998 |
| WO | WO 01/76719 | 10/2001 |
| WO | WO 01/97947 | 12/2001 |

OTHER PUBLICATIONS

U.S. Appl. No. 12/481,959 Office Action dated Jun. 7, 2010.
U.S. Appl. No. 12/469,851 Final Office Action dated Nov. 9, 2010.
U.S. Appl. No. 12/469,851 Office Action dated Jun. 28, 2010.
U.S. Appl. No. 12/227,462 Office Action dated Nov. 15, 2010.
U.S. Appl. No. 11/897,976 Final Office Action dated Sep. 1, 2010.
U.S. Appl. No. 11/897,976 Office Action dated Apr. 1, 2010.
U.S. Appl. No. 11/897,975 Final Office Action dated Jul. 21, 2010.
U.S. Appl. No. 11/897,975 Office Action dated Feb. 19, 2010.
U.S. Appl. No. 11/637,615 Final Office Action dated Aug. 2, 2010.
U.S. Appl. No. 11/637,615 Office Action dated Mar. 2, 2010.
Polyamide 6/6—Nylon 6/6—PA 6/6 60% Glass Fibre Reinforced, Data Sheet [online], AZoM™, The A to Z of Materials and AZojomo, The "AZo Journal of Materials Online" [retrieved on Nov. 23, 2005] (2005) (Retrieved from the Internet: <URL: http://web.archive.org/web/20051123025735/http://www.azom.com/details.asp?ArticleID=493>.

* cited by examiner

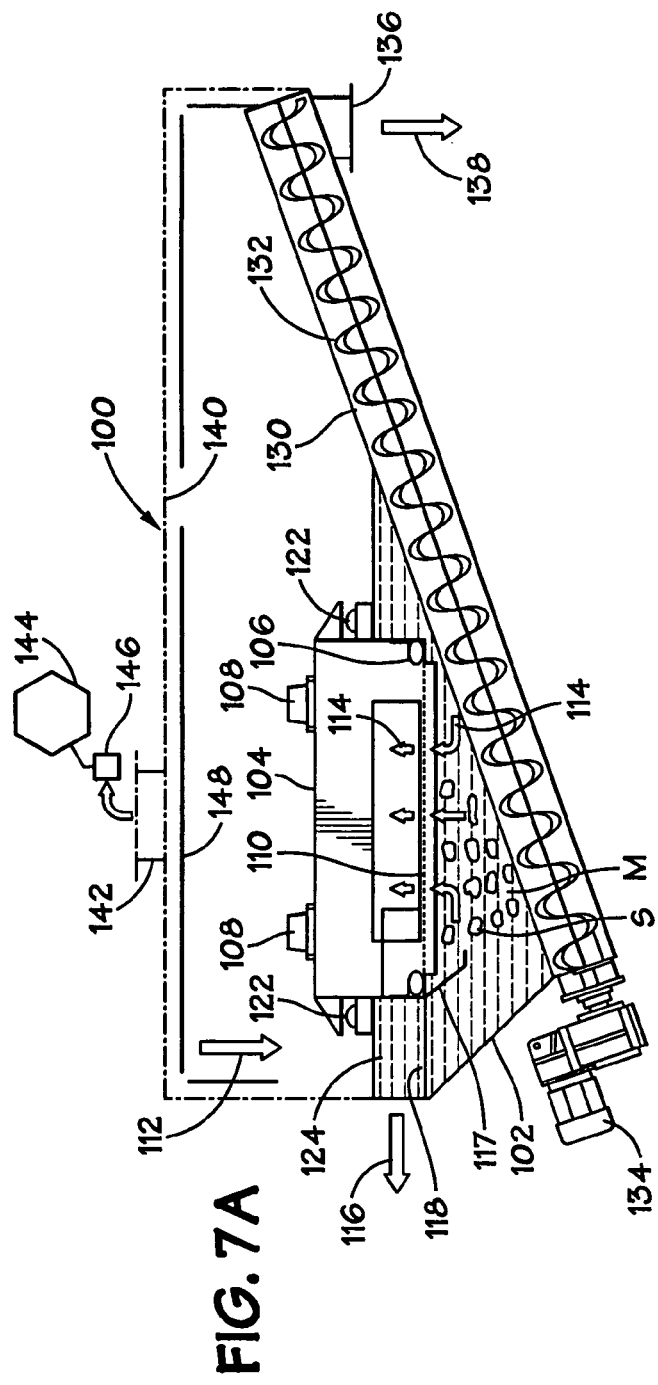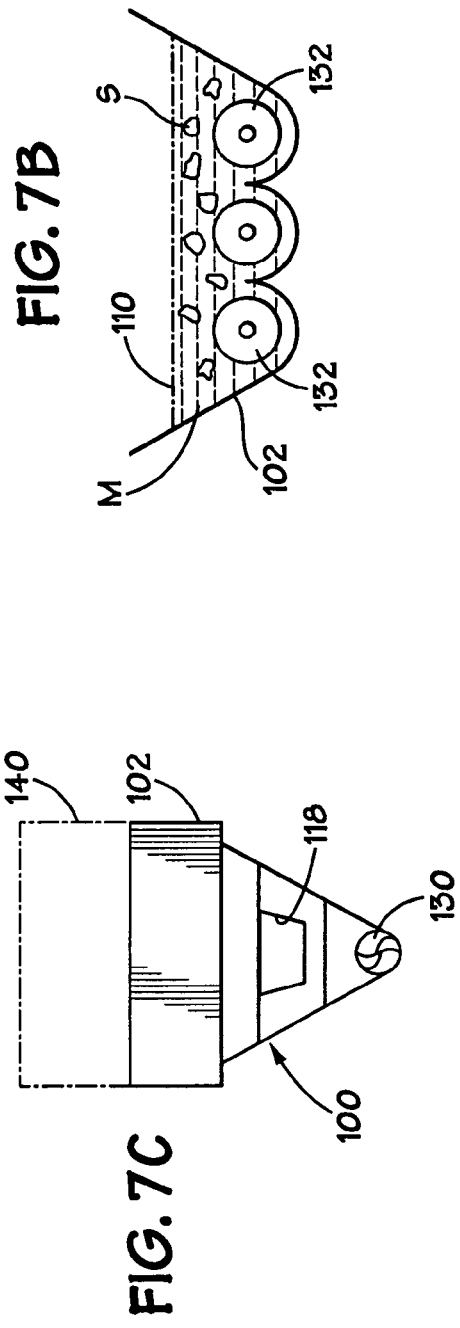

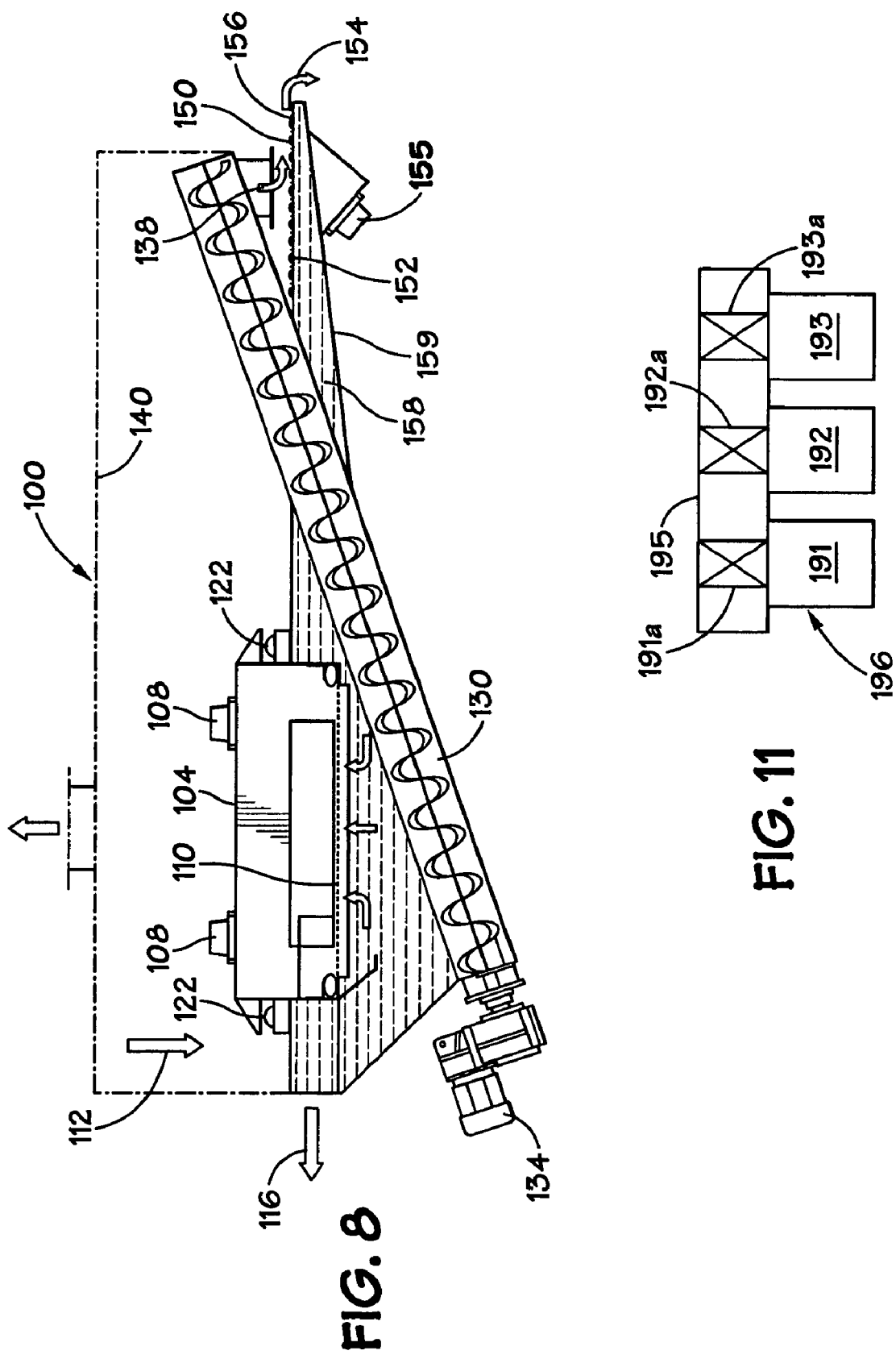

SCREEN AREA = 3.9 m2

SCREEN AREA = 3.9 m2

SHALE SHAKERS WITH CARTRIDGE SCREEN ASSEMBLIES

CROSS-REFERENCE TO RELATED APPLICATIONS

This is: a continuation-in-part of U.S. application Ser. No. 11/544,291 filed Oct. 6, 2006 now abandoned; and a continuation-in-part of U.S. application Ser. No. 11/280,975 filed Nov. 16, 2005 now abandoned and a continuation-in-part of U.S. application Ser. No. 11/280,976 filed Nov. 16, 2005 now abandoned—all of which are incorporated fully herein and with respect to all of which the present invention claims priority under the Patent Laws.

BACKGROUND OF THE INVENTION

1. Field of the Invention

The present invention is directed to shale shakers with cartridge screen assemblies.

2. Description of Related Art

Vibratory separators are used in a wide variety of industries to separate materials such as liquids from solids or solids from solids. Typically such separators have a basket or other screen holding or mounting apparatus mounted in or over a receiving receptacle or tank and vibrating apparatus for vibrating the basket. One or more screens is mounted in the basket. Material to be treated is introduced to the screen(s) either by flowing it directly onto the screen(s) or by flowing it into a container, tank, or "possum belly" from which it then flows to the screen(s). Also in some multi-screen apparatuses material flows generally horizontally or uphill from one screen to another and, in certain systems, from an upper screen onto a lower screen.

FIG. 1 illustrates an apparatus according to the prior art, in which the debris laden mud 1 flows downwardly through a vibrating flat screen 2 to filter out the debris. The screen 2 is vibrated by vibrating the whole body of the apparatus using motors 3 with eccentric weights, for example. The cleaned mud exits the apparatus and then generally is ready for re-use. Debris that does not pass through the screen is caught on the screen and is carried by the direction and amplitude of the screen vibration upwardly towards an exit 4. Corrugated shaped screens have been used in the industry. In certain prior art screens the mud passes either vertically down through the screen, as is the case with the flat screens, or has a downward component to the flow, as is the case with certain three-dimensional screens. Arrangements have been proposed where the angle of the screen is increased and may be vertical in parts.

Examples of the general configuration of filter are disclosed in U.S. Pat. No. 4,459,207, WO-A-02 43 832 and WO-A-03 028 907.

BRIEF SUMMARY OF THE INVENTION

The present invention discloses, in certain aspects, cartridge screen assemblies for processing a mixture of drilling fluid and solids which have a body with an interior and at least one screen on the body through which drilling fluid can enter the body. The present invention provides systems for using such a screen assembly for treating wellbore fluids having: a basket for containing drilling fluid to be treated by vibratory action; one or more cartridge screening assemblies according to the present invention for screening solids from the drilling fluid; a support for the screening assembly or assemblies; and, in one aspect, apparatus for facilitating the removal of separated solids from the system. Drilling fluid flowing into the interior of a cartridge screen assembly according to the present invention is evacuated therefrom for storage, further processing, and/or reuse.

The present invention discloses, in certain aspects, a vibratory separator system (e.g., but not limited to a system for treating wellbore fluids) having: a basket for containing material to be treated by vibratory action, the material containing liquid and solids; a screening apparatus in the basket for screening solids from the material, the screening apparatus including a screen support and at least one screen through which liquid in the material is passable and through which solids in the material are not passable; a first vibratory apparatus secured to the screen support for vibrating the screen support and thereby vibrating the at least one screen; and a second vibratory apparatus connected to the at least one screen for vibrating the at least one screen. In one aspect the material is drilling material, the liquid is drilling fluid, and the solids are drilling solids entrained in the drilling fluid.

In certain aspect in such vibratory separator systems, wherein material to be treated flows up to the at least one screen; liquid in the material flows up and through the at least one screen; and solids in the material contact and do not flow through the at least one screen; and at least part of the basket is disposed beneath the at least one screen.

In an upflow vibratory separator in which material to be treated flows up to a primary screen assembly in a box and fluid in the material flows up and through the primary screen assembly and solids in the material contact and do not flow through the primary screen assembly, the material flowing in and from a container, vibratory apparatus for vibrating the box and the primary screen assembly, at least part of the container disposed beneath the primary screen assembly, the improvement of a primary conveyor beneath the primary screen assembly for removing solids, the primary conveyor in one aspect having an auger inclined upwardly, and/or a deflector in the container for deflecting material away from the primary screen assembly.

The present invention, in certain aspects, discloses a vibratory separator system including a plurality of upflow vibratory separators, one adjacent the other, a common feed conduit for feeding material to be treated to the plurality of upflow vibratory separators, each upflow vibratory separator including a valve for selectively controlling the flow of the material thereto, each upflow vibratory separator an upflow vibratory separator according to the present invention.

The present invention teaches, in certain aspects, new non-obvious systems for vibratory separation of components of a material fed to the vibratory separator (e.g. a mixture of drilling fluid and solids), the system including: a container into which material is feedable, the material including components to be separated by vibratory separation, the components including liquids and solids; a box within the container; vibratory isolation apparatus (e.g. springs) connected to the container, the box connected to the vibratory isolation apparatus; screening apparatus connected to the box for screening the material to separate solids from the material; the screening apparatus including a plurality of spaced-apart screening cartridges connected to the box, each cartridge having at least one fluid exit port from which fluid separated from the material by the screening cartridge passes from the screening cartridge; a vibrator connected to the box for vibrating the screening cartridges; and the container having a fluid outlet from which separated fluid from the at least one fluid exit port of each screening cartridge flows from the system. In one aspect, such a system has auger apparatus beneath the screening apparatus for receiving solids not passing through the screening apparatus and for moving said solids from the system.

The present invention teaches, in certain aspects, new nonobvious systems for vibratory separation of components of a material fed to the vibratory separator, the system having: a container into which material is feedable, the material including components to be separated by vibratory separation, the components including solids; a box within the container, the box connected to the container via vibratory isolation apparatus; screening apparatus connected to the box for screening the material to separate solids from the material; the screening apparatus including a plurality of spaced-apart screens connected to the box; a vibrator connected to the box for vibrating the screens; the container having a fluid outlet from which separated fluid from each screen flows from the system; and the screens including at least one first screen at a first level and at least one second screen at a second level, the first level different from the second level. In one aspect, the at least one second screen has sides defining a hollow interior, and a portion of the at least one second screen projecting to the first level adjacent a portion of the at least one first screen so that a path is defined between said portion and said at least one first screen.

Accordingly, the present invention includes features and advantages which are believed to enable it to advance vibratory screening technology. Characteristics and advantages of the present invention described above and additional features and benefits will be readily apparent to those skilled in the art upon consideration of the following detailed description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention or of the claims in any way.

It will be understood that the various embodiments of the present invention may include one, some, or all of the disclosed, described, and/or enumerated improvements and/or technical advantages and/or elements in claims to this invention.

Certain aspects, certain embodiments, and certain preferable features of the invention are set out herein. Any combination of aspects or features shown in any aspect or embodiment can be used except where such aspects or features are mutually exclusive.

BRIEF DESCRIPTION OF THE SEVERAL VIEWS OF THE DRAWING

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 7A is a schematic side cross-section view of a system according to the present invention.

FIG. 7B is a cross-section view of part of the system of FIG. 7A.

FIG. 7C an end view of the system of FIG. 7A.

FIG. 8 is a schematic side cross-section view of a system according to the present invention.

FIG. 11 is a top schematic view of a system according to the present invention.

Figure 1:
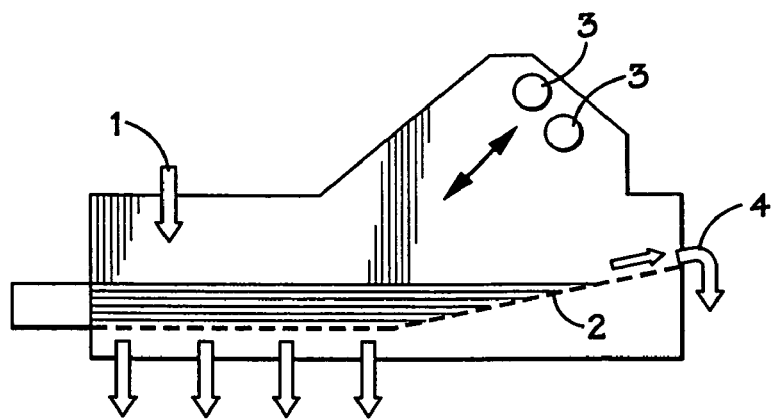
FIG. 1 is a diagram illustrating a prior art screening apparatus.

Presently preferred embodiments of the invention are shown in the above-identified figures and described in detail below. It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiment, and are not intended to mean the claimed invention of any particular appended claim(s) or all of the appended claims. Accordingly, the subject or topic of each such reference is not automatically or necessarily part of, or required by, any particular claim(s) merely because of such reference.

DETAILED DESCRIPTION OF THE INVENTION

FIGS. 1-4 present subject matter which the present invention improves.

Figure 2:
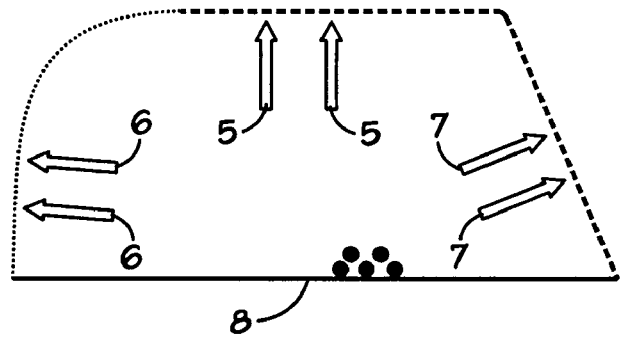
FIG. 2 is a diagram illustrating various mud flow paths in apparatus according to the invention.

FIG. 2 shows new directions of flow for drilling fluid or mud with entrained debris. The mud passes through the screen either vertically 5, horizontally 6, or with an upward component 7. The debris falls under gravity to the lower surface 8 where it is conveyed out of the apparatus. The lower surface 8 may be a mesh screen, a roughened plate or a rotating belt or chain(s). The design of the apparatus is such that it is not possible for debris laden mud to bypass the screens. Unlike in certain prior art configurations, the mud is introduced into a compartment under the screens, not from above the screens. The pressure required to force the mud through the screen is provided by the height of a pool of mud adjacent to the screening compartment, although alternatively this could be provided for by other means such as a centrifugal pump.

Figure 3:
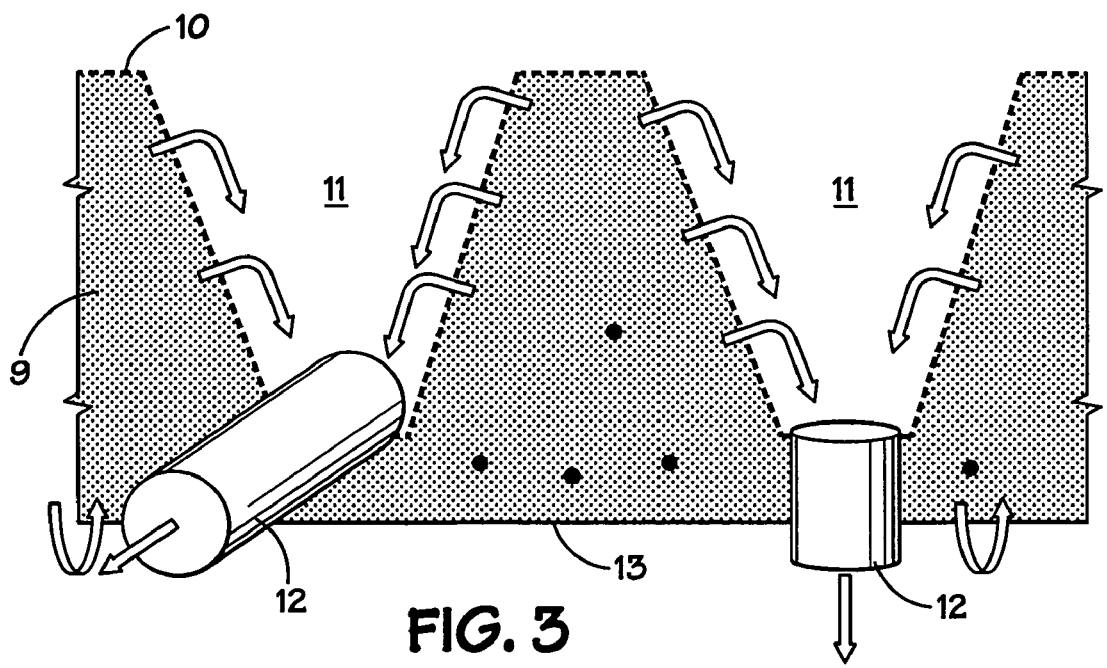
FIG. 3 is a diagrammatic end view of an apparatus according to one exemplary embodiment of the invention.
Figure 4:
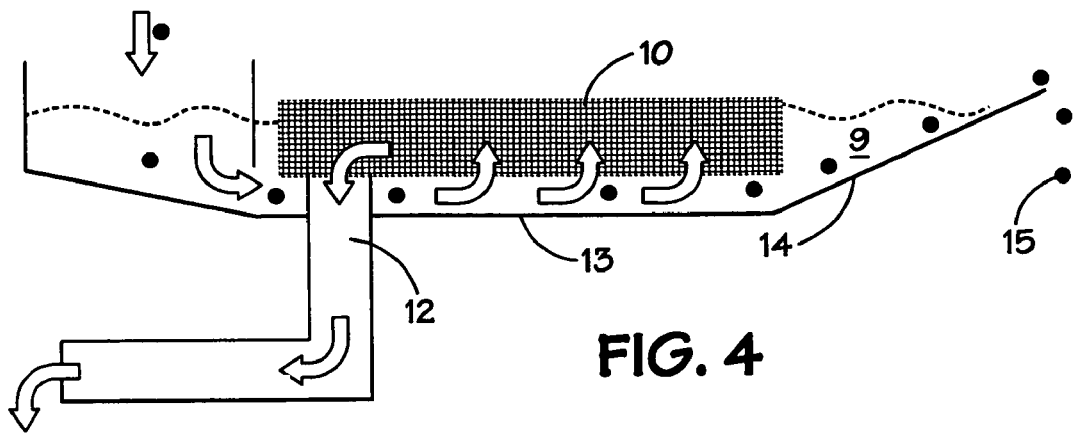
FIG. 4 is a side view of the apparatus of FIG. 3.

Referring now to FIGS. 3 and 4, debris-laden fluid or mud is introduced into a pool 9, and the fluid is forced through a vibrating screen 10 into a channel 11 that allows the substantially debris free mud to flow via pipe work or channels 12 to tanks for subsequent re-use. The cleaned mud may either exit the shakers from the sides or bottom of the shaker. The debris falls under gravity to a lower surface 13, which conveys the debris out from under the screen by vibration or via a moving belt. An inclined surface 14 conveys the debris out of the pool. This mode of conveyance may alternatively be a moving belt; however it is preferably similar to prior art inclined surfaces and consists of a vibrating screen which will assist the removal of mud from the debris. The debris 15 exiting the device may be sent to a screw press, centrifugal device or prior art shaker to further recover mud closely associated with the debris.

Figure 5:
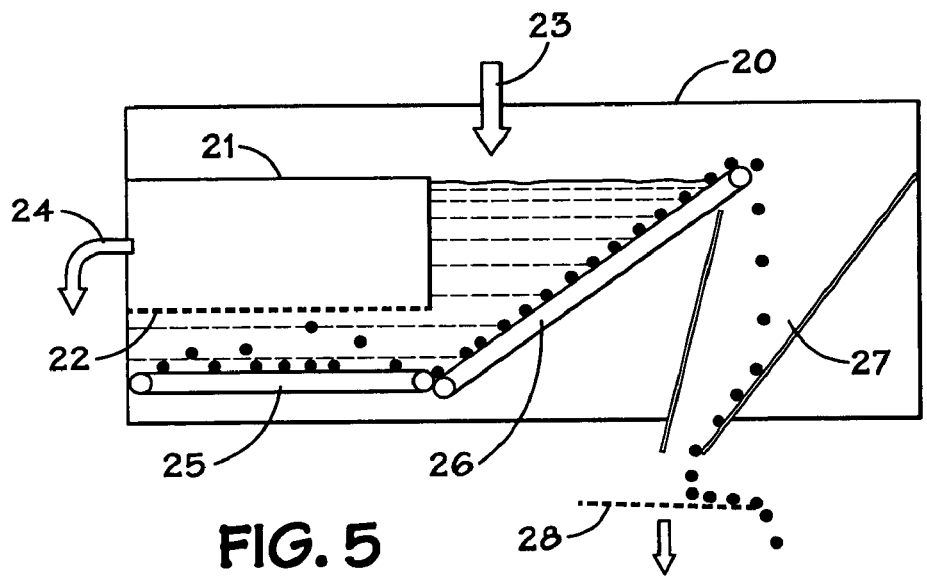
FIG. 5 illustrates an alternative embodiment of the invention.

FIG. 5 shows an alternative arrangement, in which a main enclosure 20 contains a filter body 21 whose lowermost wall consists of a screen 22 which can be vibrated with the body 21 or independently thereof. In either case, the energy required to vibrate the screen is substantially smaller than would be required for vibration of the whole apparatus, as in the prior art apparatus. Debris-laden mud enters at 23 and the head of mud above the level of the screen 22 is sufficient to drive the mud through the screen into the body 21, from where it can flow out at 24 for re-use. Debris retained by the screen 22 is dislodged by the vibration and falls on to a horizontal conveyor belt 25, which carries it on to an inclined conveyor belt 26. This belt 26 carries the debris out of the mud and discharges it into a chute 27, from which it falls on to a secondary vibrating screen 28 arranged to remove residual mud for re-use before discharging the debris for disposal.

Figure 6:
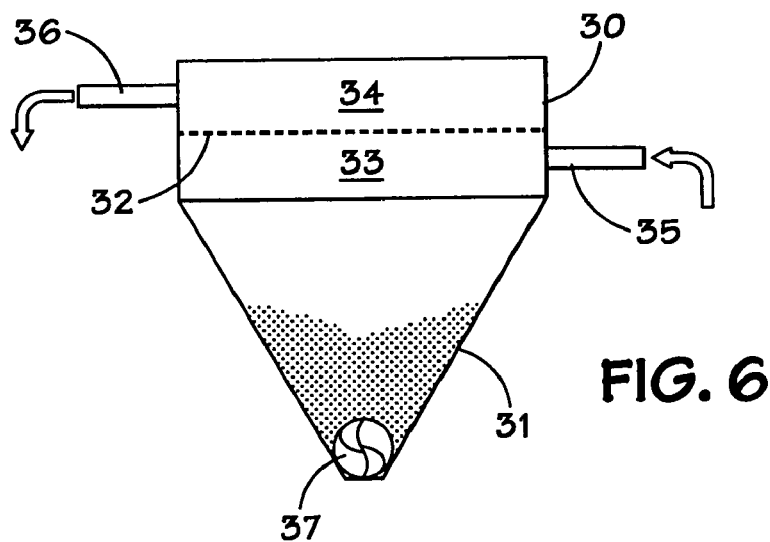
FIG. 6 illustrates yet another embodiment of the invention.

The embodiment of FIG. 6 has a filtration section 30 of uniform cross-section and a tapering section 31 beneath it. The filtration section 30 contains a vibrating screen 32 mounted so as to separate the filtration section into two sections: a lower inlet section 33 and an upper outlet section 34. The inlet section 33 is supplied with debris-laden mud via a supply pipe 35. The mud is pumped or otherwise supplied at a pressure sufficient to urge it upwardly through the vibrating screen 32 and into the outlet section 34, from where it flows for re-use through an outlet pipe 36.

Debris retained by the screen 32 falls into the tapering section 31, where it settles. An auger 37 is mounted in the lowermost part of the tapering section 31 and can be driven by an external motor (not shown) to urge the settled material out of the apparatus for disposal or further filtration or treatment as required to extract any residual liquid mud. In order to ensure that the minimum of liquid is removed in this manner, the tapering section 31 can be provided with a sensor to detect density or liquid content of the settled material above the auger 37 and to prevent operation of the external motor when the liquid content of the material adjacent to the auger is above a predetermined proportion, thereby preventing the loss of excess liquid mud.

It will be understood that, while the debris is represented in the drawings as discrete lumps or rock pieces, it will typically be a mixture of larger and smaller particles and pieces.

FIGS. 7A-7C illustrate a system 100 according to the present invention which has a housing 102 for containing material M to be treated. A screen apparatus 110 is removably secured to a box 104 which is mounted to the housing 102. Any known structure and/or apparatus may be used to removably secure the screen apparatus 110 to the box 104 and, as shown, in one aspect, a known inflatable seal apparatus 106 is used for this purpose.

Vibratory apparatus 108 connected to the box 104 vibrates the box 104 and thus the screen apparatus 110. Any suitable known vibratory apparatus may be used for the vibratory apparatus 108. Any suitable known screen or screens, screen assembly or screen assemblies may be used for the screen apparatus 110. The box 104 is mounted on anti-vibration mounts 122.

An arrow 112 indicates the introduction of the material M (including, but not limited to, drilling material including drilling fluid or mud, and drilled solids and debris) into the housing 102. Arrows 114 indicate the flow of the material M up to and through the screen apparatus 110. An arrow 116 indicates the discharge of recovered cleaned fluid 124 through a discharge duct 118 from the box 104 (shown schematically in FIG. 7C). In one aspect the duct 118 is flexible or has a flexible portion so that the duct 118 and the box 104 can be lowered in the housing 102, e.g. for access, maintenance, or cleaning. A deflector 117 directs incoming fluid flow. Heavier solids, directed by the deflector 117, will flow downwardly to the conveyor system 130 and will not impact the screen apparatus 110.

Solids S that do not pass through the screen apparatus 110 fall within the housing 102 and enter a conveyor system 130. An auger apparatus 132 rotated by a motor 134 augers the solids S up to a discharge opening 136. An arrow 138 indicates the flow of the material with discharged solids from the system 100 to storage, to disposal, or to additional processing.

According to the present invention, one, two, three, four, or more auger apparatuses may be used with a system according to the present invention; e.g. the system 100 as shown in FIG. 7B has three auger apparatuses 132. Optionally, the system 100 is enclosed with an enclosure 140. In one aspect air, fumes, gases, and/or material entrained in air above the box 104 are evacuated through an access opening 142. Optionally this is accomplished by an HVAC system 144 and/or a filtration system 146 with appropriate pumping apparatus and/or vacuum apparatus. Optionally the enclosure 140 itself or the enclosure 140 with sound insulation material 148 reduces noise from the system 100.

FIG. 8 illustrates one embodiment of the system 100 (and like numerals indicate like parts) which includes a screen apparatus 150 which receives the discharged material 138. It is within the scope of the present invention for the screen apparatus 150 to be inclined downwardly and for material to move off of it under the influence of gravity; or, as shown, in FIG. 8 the screen apparatus 150 includes vibratory apparatus 155 (like, e.g. the vibratory apparatus 108) which vibrates a screen or screens 152 (e.g. like the screen apparatus 110). Separated solids 154 flow off an exit end 156 of the screen(s) 152 and reclaimed fluid 158 flows to a receptacle or container 159.

Figure 9A:
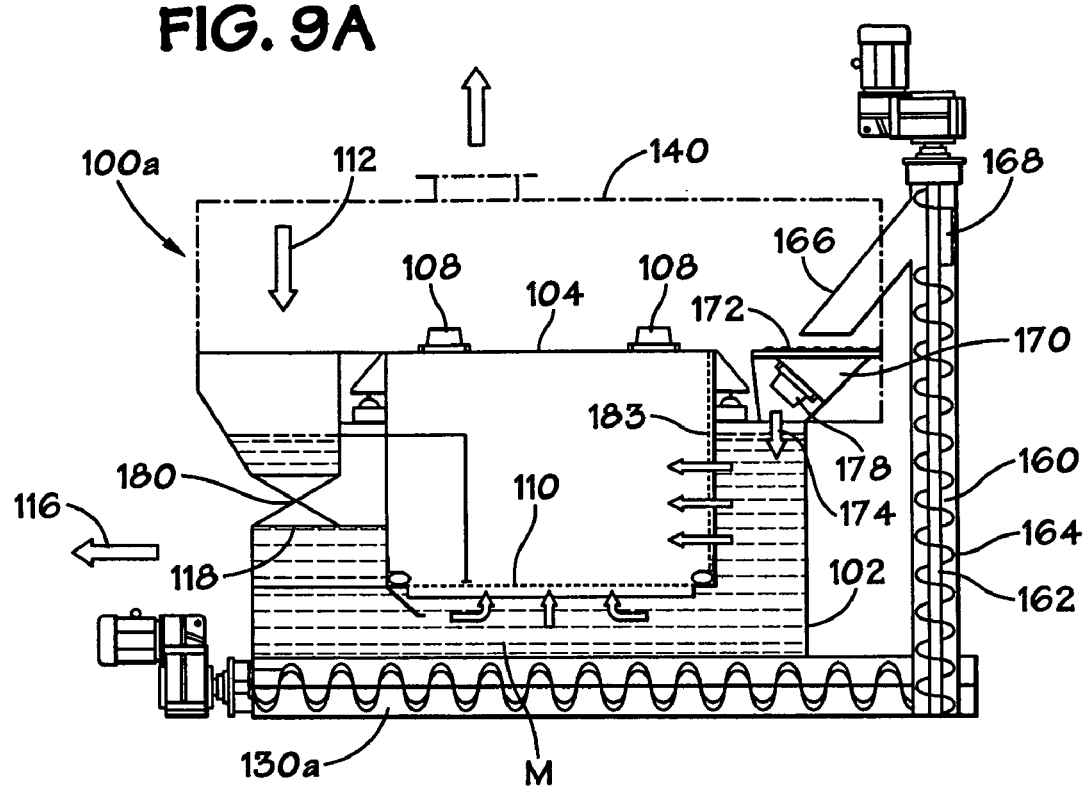
FIG. 9A is a schematic side cross-section view of a system according to the present invention.
Figure 9B:
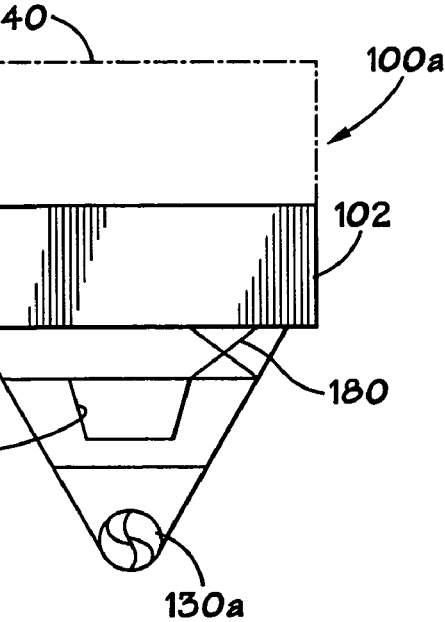
FIG. 9B is an end view of the system of FIG. 9A.
Figure 9C:
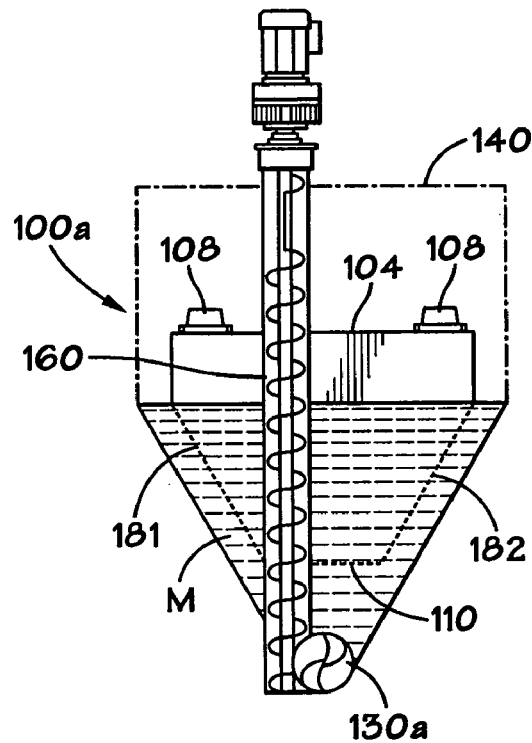
FIG. 9C is a cross-section view of the system of FIG. 9A.

FIGS. 9A-9C illustrate an embodiment of a system 100 according to the present invention (like numerals indicate like parts) which includes at least one additional conveyor system 160 (like the conveyor system 130) which is oriented in a generally vertical orientation. A conveyor system 130a, like the system 130, may be oriented as shown in FIG. 7A or, as shown in FIG. 9A, may be oriented generally horizontally. The conveyor system 130a moves material with separated solids to the conveyor system 160 which, in turn, moves the material up to an exit duct 166. An optional paddle 168, secured to an auger apparatus 162 of the system 160 so that it is adjacent the duct 166, facilitates the movement of material into the exit duct 166. In one aspect the paddle 168 is a straight blade section on the auger apparatus 162 (as opposed to screw flights on the rest of the auger apparatus 162. Optionally, in one aspect a reversed flight 169 is used at the top of the auger apparatus (see, e.g. FIG. 10A) which moves material downwardly to the duct 166. Such a flight 169 can be used with the paddle 168.

Material with separated solids may, according to the present invention, flow to storage or to further processing or, as shown in FIG. 9A, may be introduced to a vibratory separator apparatus 170 with screening apparatus 172 (like the screening apparatus 110) vibrated by vibratory apparatus 178 (like the vibratory apparatus 108). It is within the scope of the present invention for the material with solids separated by the vibratory separator apparatus to flow to disposal, to storage, or to further processing. Reclaimed fluid from the vibratory separator apparatus 170 can be directed to storage or to a container; or, as shown in FIG. 9A by an arrow 174, it can flow back into the housing 102.

Optionally, a valve 180 selectively controls the flow of fluid into the housing 102. Optionally, in addition to (or instead of) the screen apparatus 110, one or more walls of the box 104 may have a screen mounted therein or thereon, or a screen or screens can be secured to the box 104. For example, as shown in FIG. 9C two inclined screens 181, 182 (like the screen apparatus 110) are secured to the box 104 and material M is flowable through the screens 181, 182 and through the screen apparatus 110. Additionally, and optionally, a further screen 183, oriented generally vertically, may be located to a vertical face 184 of the box 104.

In certain aspects, the use of an additional conveyor, such as the conveyor system 160, makes it possible for the material depth within the housing 102 to be increased as compared to a system with a lower conveyor system or systems. This can permit a screen apparatus to be set relatively deeper in a box which can result in side screens being taller so that more screening area is provided in a specified footprint area. In certain aspects according to the present invention, to empty a system as in FIG. 9A a height adjustment is made for both the box 104 and the duct 118.

Figure 10A:
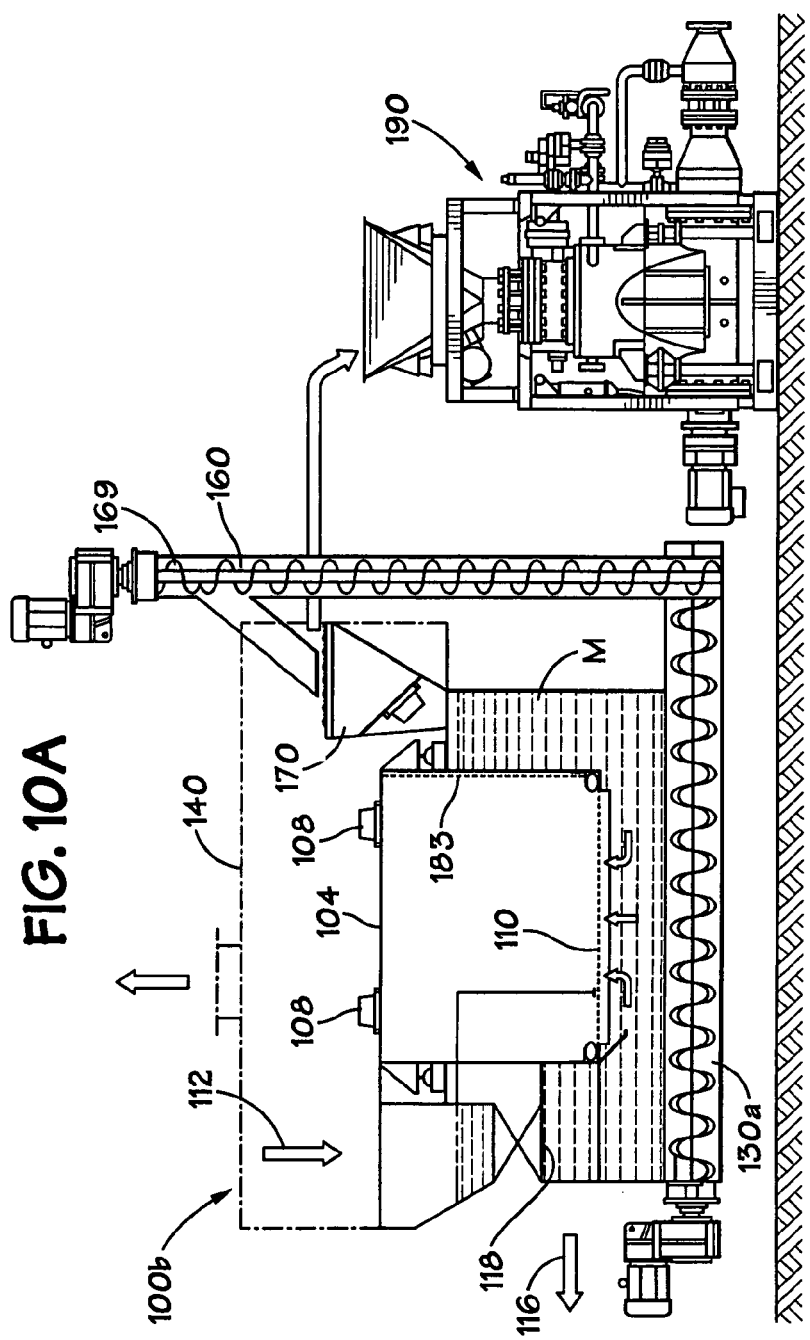
FIG. 10A is a schematic side cross-section view of a system according to the present invention.
Figure 10B:
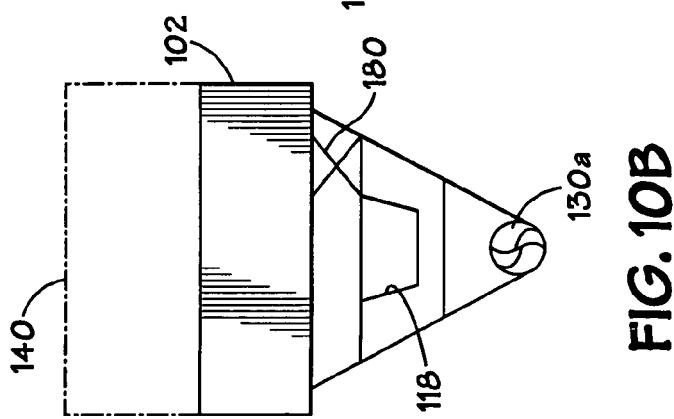
FIG. 10B is an end view of the system of FIG. 10A.

FIG. 10A illustrates a system 100b like the system 100a of FIG. 9A (like numerals indicate like parts) which includes a solids conveying system 190. Solids separated by the vibratory separator apparatus 170 are introduced to the solids conveying system 190. In one particular aspect the solids introduced to the system 190 are drilled cuttings separated from a material that includes drilling fluid and drilled solids ("drilled cuttings") and the system 190 is a drilled cuttings conveyance system. It is within the scope of the present invention to employ any suitable known cuttings conveyance system for the system 190.

As shown in FIG. 11 a system 196 according to the present invention may have a plurality of vibratory separators 191, 192, 193 (as any according to the present invention; in one aspect, each vibratory separator is a shale shaker processing drilling material). Material to be processed flows in a feed conduit or "gutter" 195 and each separator or shaker 191-193 has a flow valve 180a, 180b, 180c, respectively which selectively controls flow to each separator or shaker 191-193. Thus one, two or three separators or shakers 191-193 can be operational as desired. It is within the scope of the present invention to provide one, two, three, four, five, six or more separators or shakers in a system 196 according to the present invention.

Figure 12:
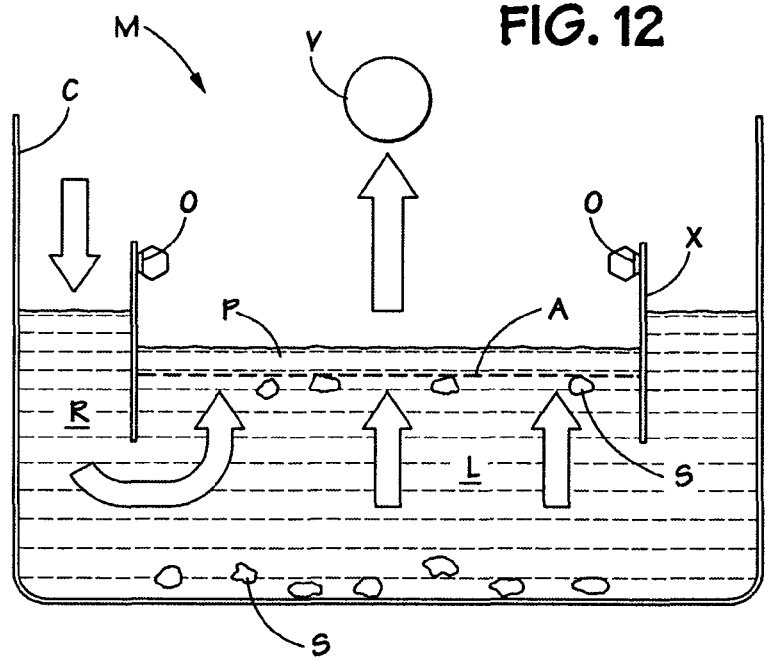
FIG. 12 is a schematic side cross-section view of a system according to the present invention.

FIG. 12 shows a system M according to the present invention which has a container C into which material R is introduced, e.g. the material including liquid L and solids S. The material R flows to a screen apparatus A which is mounted in a basket or box X. Part P of the material, e.g. liquid or liquid plus some solids, flows up through the screen apparatus A. The part P is removed from the system by removal apparatus V (e.g. vacuum or pump apparatus). Part of the material, e.g. solids S and agglomerations or masses of solids, either settles down in the container C without contacting the screen apparatus A or, upon being prevented from further upward flow by the screen apparatus A and/or by material already adjacent the screen apparatus A, falls downwardly in the container C.

Electromagnetic vibrator apparatus O vibrates the basket X and, thus, the screen apparatus A. It is within the scope of the present invention to use one, two, three, four or more electromagnetic vibrator apparatuses (and to do so for any vibrator or vibration apparatus of any embodiment disclosed herein). It is within the scope of the present invention for the screen apparatus A (and the apparatus 110 described below) to be any suitable known screen or screen assembly used for vibratory separators or shale shakers. In one particular aspect the material R is drilling material with drilling fluid and drilled solids. Instead of, or in addition to, one or more electromagnetic vibrator apparatuses, according to the present invention, (as is true for any embodiment according to the present invention) one, two, three, four or more piezoelectric vibration apparatuses are used. Also, according to the present invention any vibrator or vibration apparatus of any embodiment according to the present invention may be connected directly to the screen apparatus instead of to the basket X. Appropriate mounts and/or isolators and/or shock absorbers O may be used to mount the vibrator or vibration apparatuses to a basket or directly to a screen apparatus.

Figure 13:
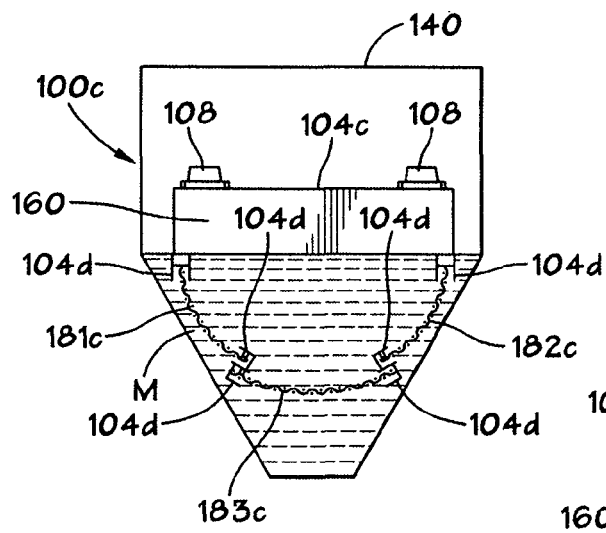
FIG. 13 is an end cross-section view of a box according to the present invention.
Figure 14:
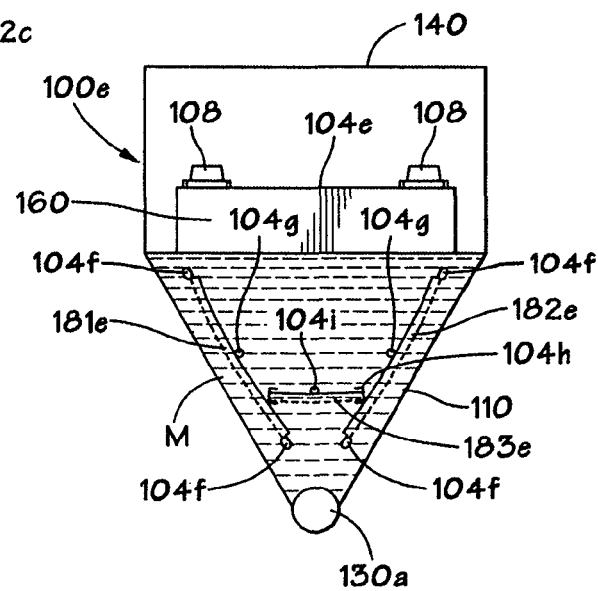
FIG. 14 is an end cross-section view of a box according to the present invention.

It is within the scope of the present invention for any screen or screen assembly in any box or container of any system according to the present invention to be bowed, inwardly or outwardly, i.e., not flat across its extent (outwardly as in FIGS. 13, 14).

As shown in FIG. 13 a system 100c according to the present invention (like the systems 100, 100a, 100b-like numerals indicate like parts) a box 104c (like the box 104) has clamping apparatus 104d connected to the box 104 that releasably holds screens 181c, 182c and 183c in an outwardly bowed configuration. One, some or all of the screens or screen assemblies in a box can be bowed, outwardly or inwardly.

FIG. 14 shows a system 100e with a box 104e (like the system 100c and box 104c, but with differences discussed below; like numerals regarding the systems 100, 100a, 100b, and 100c indicate like parts). Inflatable bladder apparatus 104f associated with screens 181e and 182e bow these screens over central members 104g. Holding apparatus 104h holds a screen 183e bowed over a central member 104i.

Figure 15:
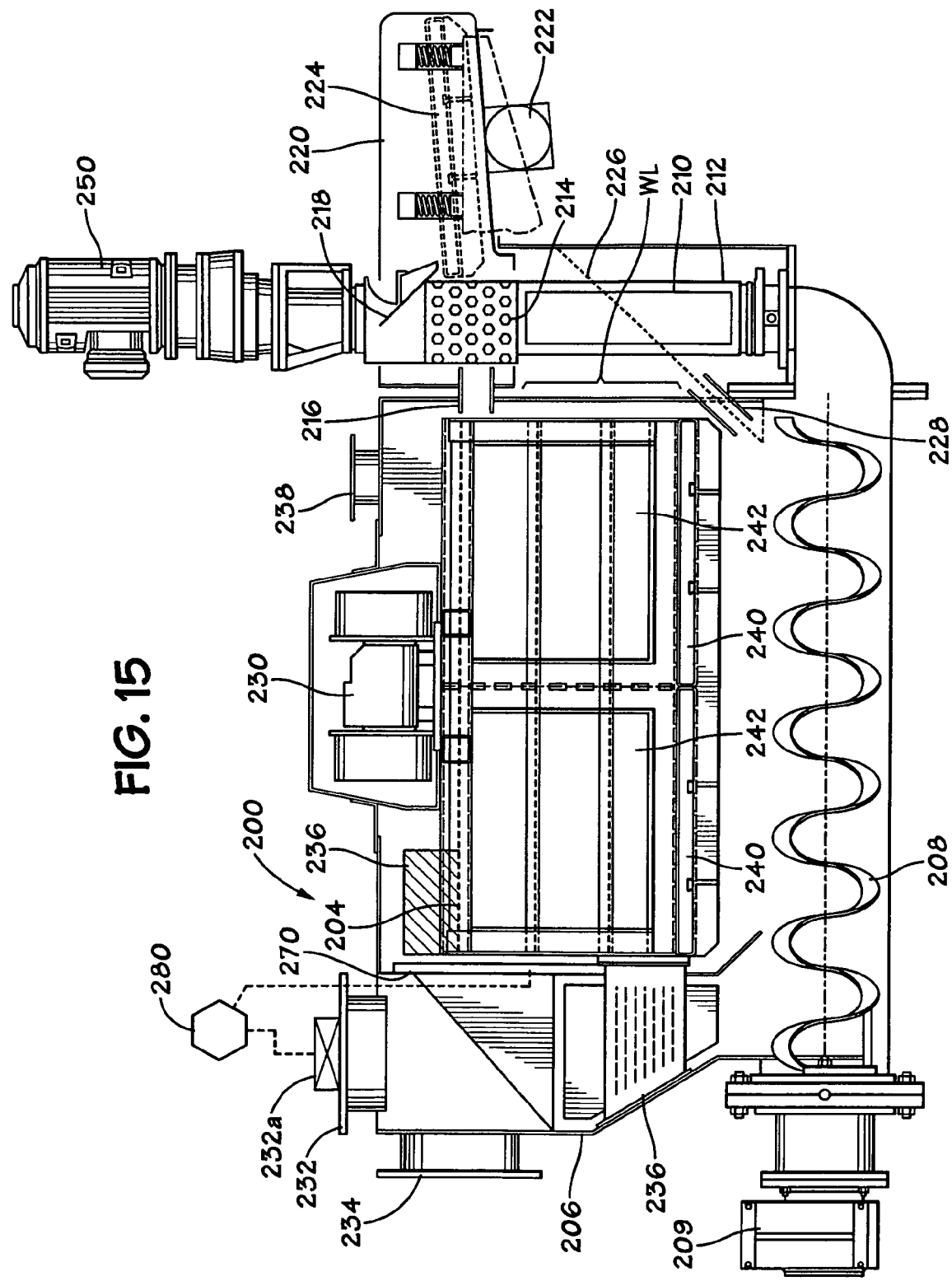
FIG. 15 is a side cross-section view of a system according to the present invention.

FIG. 15 shows a system 200 according to the present invention which has a box 204 according to the present invention (e.g. any box according to the present invention, e.g. like the boxes of FIGS. 7A, 8, 9A, 9C, 10A, 13, 14) removably secured within a basket 206. Separated material (with some liquid) flows down to an auger system 208 which moves the material to an optional pump apparatus 210 (shown schematically) in a housing 212.

Material flowing up in the housing 212 (in one aspect moved by the pump apparatus 210 driven by a motor 250) encounters a porous body 214 which permits liquid (e.g. drilling fluid from the material) to flow in a line 216 back into the basket 206. Solids (with some liquid) flow on a member 218 either out of the system for storage and/or further processing or, as shown, flow to a secondary shaker system 220.

In the secondary shaker system 220 a motor 222 vibrates a screen or screens 224 mounted on isolation mounts 226. Liquid flowing down through the screens 224 flows down to a member 226 and then back into the basket 206 through a line 228; or, optionally, the wall WL is removed. Solids (with some liquid) flow off the ends of the screen(s) 224 for collection, storage, and/or further processing.

The basket 206 has primary inlet 232 and, optionally, an alternative or additional inlet 234 for material (e.g. drilling fluid with drilled solids entrained therein) to be treated by the system 200. Overflow is handled with a liquid overflow line 236. Gases are vented through a vent connection 238. A motor 230 vibrates the box 204 (optionally, the motor 230 vibrates the basket 206 or the basket 206 and the box 204).

Screens 240 (at the bottom) and screens 242 (on the sides) are removably secured to the box 204 (two screens 242 on each box side).

A level sensor 270 senses the level of material in the basket 206 and sends a signal indicative of the level to a control system 280. The control system 280 processes these signals and controls basket speed and vibration which affect the feed of material into the basket 206. The control system 280 is used to maintain a desired level of material in the basket and for controlling a valve 232a which permits flow to the inlet 232.

The apparatus 210 and/or the secondary shaker 200 can be used with any system according to the present invention.

Figure 16:
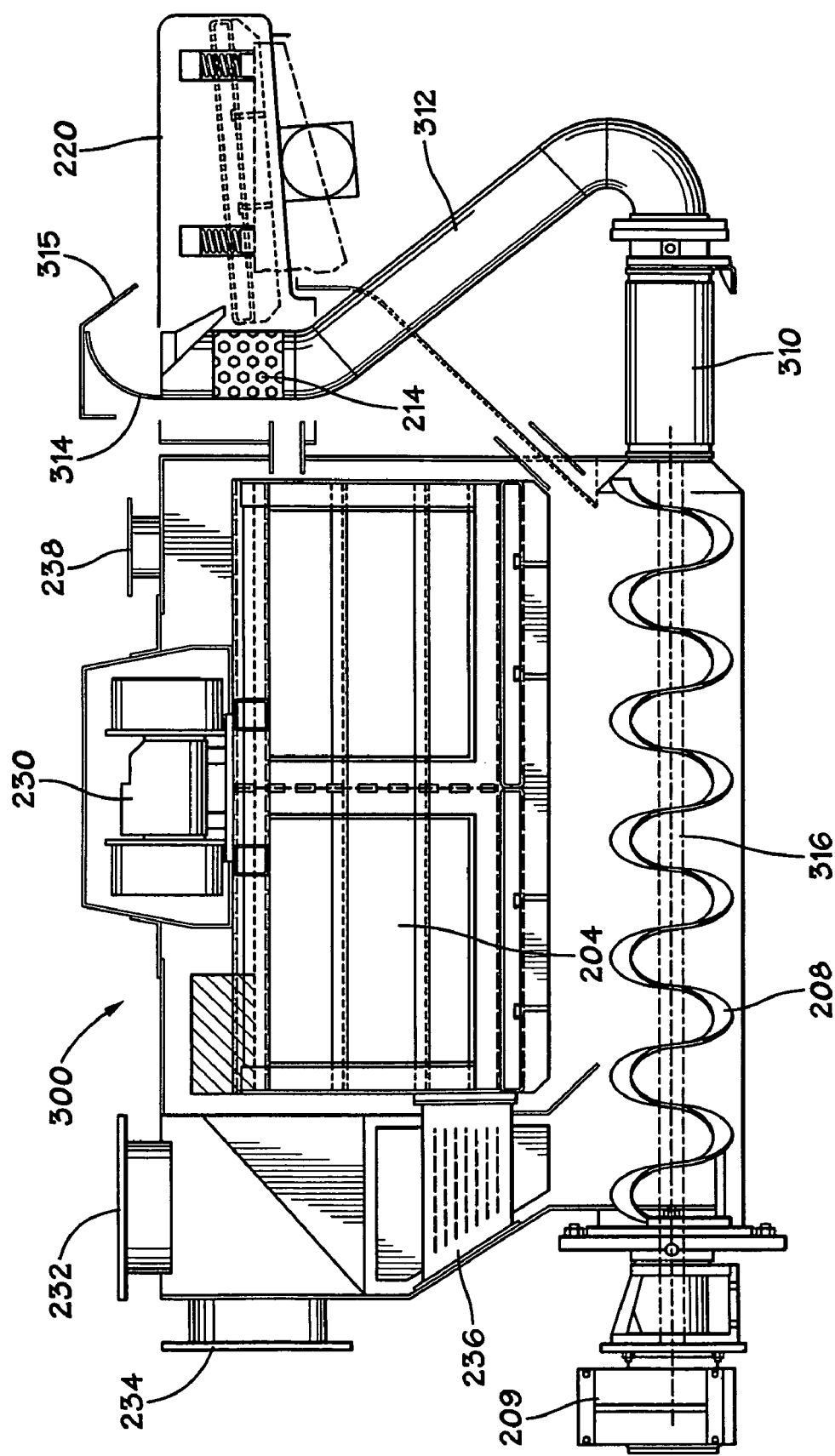
FIG. 16 is a side cross-section view of a system according to the present invention.

FIG. 16 shows a system 300 like the system 200 (like numerals indicate like parts) but without the apparatus 210. The auger 208 feeds material to a pump apparatus 310 which pumps the material in a line 312 up to the filter 214.

In one aspect the pump apparatus 310 is a MONO (trademark) pump from Mono Pumps Ltd and in one particular aspect a MONOBLOC (trademark) B Range pump is used.

Material pumped upwardly past the filter 214 is directed by members 314 and 316 to the secondary shaker 220. In certain aspects the auger 208 and the pump apparatus 310 each has its own dedicated motor drive system. As shown in FIG. 16, a single drive system 209 turns the auger 208 and drives the pump apparatus 310 via shaft 316.

In certain aspects the auger 208 is deleted and the pump apparatus 310 alone evacuates material from beneath the box 204 and transfers it into the line 312. It is within the scope of the present invention in any system disclosed herein to delete auger apparatus(es) (any one, two, or all) and replace it or them with a pump apparatus like the pump apparatus 310.

Figure 17A:
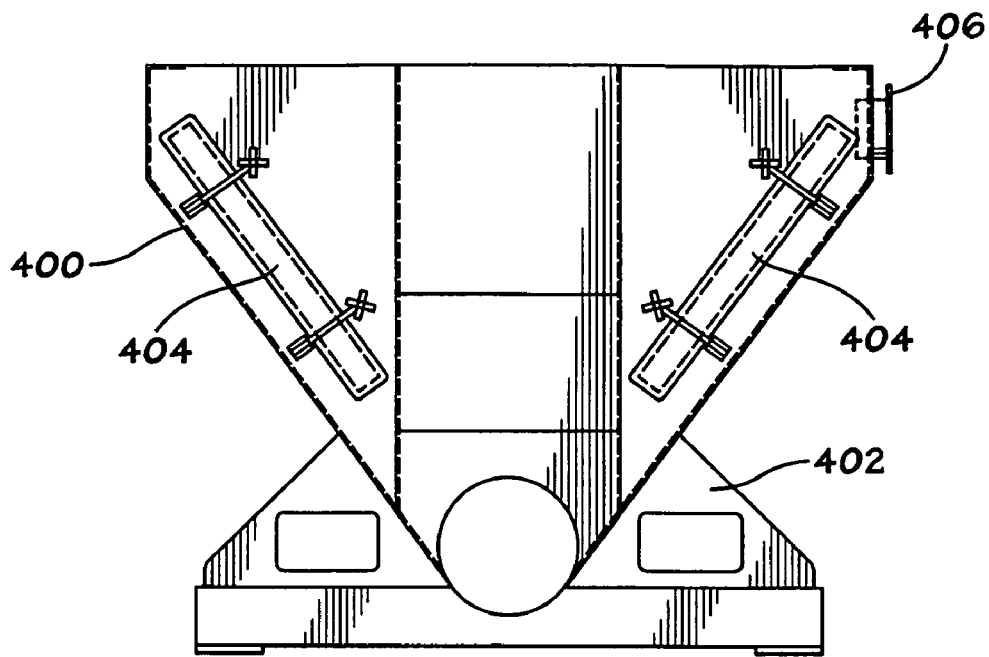
FIG. 17A is an end view of a system according to the present invention.
Figure 17B:
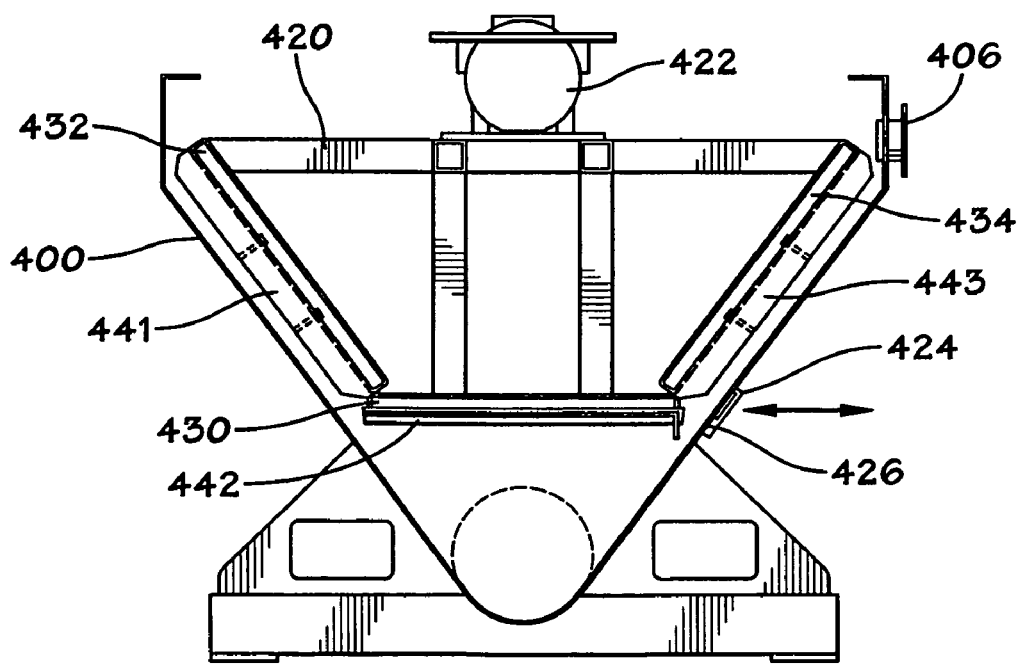
FIG. 17B is a cross-section view of a system according to the present invention.

FIGS. 17A and 17B show an end view and a cross-section view, respectively, of certain embodiments of systems according to the present invention (which may, e.g., be employed in the systems of FIGS. 7A, 8, 9A-9C, 10A, 13, 14, 15 and/or 16).

A basket 400 (e.g. like the basket 206) on a base 402 has removable doors 404 which provide access to side screens on a box within the basket 400 and permit screen removal and installation. An overflow outlet 406 permits material to exit the basket 400 to prevent overflow of the basket 400.

FIG. 17B shows a box 420 within a basket 400 (a box which may be used with any system herein). The box 420 is vibrated by a motor or motors 422. A removable cover 424 over an opening 426 permits access to a lower screen 430. If two lower screens are present, another opening like the opening 426 with a cover like the cover 424 permits access to the additional screen. Side screens 432, 434 can be accessed through doors like the doors 404, FIG. 17A. Optionally, the screens are on screen carriers 441, 442, 443 and, via the doors 404 or the openings 426, an entire screen carrier with a screen thereon can be removed or installed. Doors like the doors 404 can be at either end or both ends of a box.

The present invention, therefore, provides in certain, but not necessarily all embodiments, —in an upflow vibratory separator in which material to be treated flows up to a primary screen assembly in a box and fluid in the material flows up and through the primary screen assembly and solids in the material contact and do not flow through the primary screen assembly, the material flowing from a container to the primary screen assembly, vibratory apparatus for vibrating the box and the primary screen assembly, at least part of the container disposed beneath the primary screen assembly,—a material input for introducing the material into the container, a deflector adjacent the material input for directing material flowing through the material input away from the primary screen assembly. Any such separator may include one or some, in any possible combination, of the following with or without the deflector: a primary conveyor beneath the primary screen assembly for removing solids; locating conveyor means beneath the screen to carry the debris away from the screen; passing the separated debris through a further separation stage to remove entrained drilling fluid therefrom; conveyor means beneath the screen to carry the debris away from the screen; and/or separation means associated with the conveyor means for removing entrained mud from the debris; wherein the solids include liquid, the upflow vibratory separator further including separation apparatus for receiving solids conveyed by the primary conveyor, the separating apparatus for separating liquid from the solids; wherein the separation apparatus includes a secondary screen assembly for separating the solids from the liquid, the liquid flowing down through the secondary screen assembly; vibration apparatus for vibrating the secondary screen assembly; wherein the material is drilling material including drilling fluid and drilled solids; a secondary container for receiving and containing fumes from the material; evacuation apparatus for removing fumes from the secondary container; filtration apparatus for filtering fumes from the secondary container; the primary screen assembly mounted generally horizontally, and at least one tertiary screen assembly mounted non-horizontally for treating the material; wherein the at least one tertiary screen assembly is two spaced-apart tertiary screen assemblies, each extending upwardly from the primary screen assembly; a valve for controlling flow of material into the container; secondary conveyor for receiving the solids conveyed by the primary conveyor and for conveying the solids away from the primary conveyor, the solids including liquid; wherein the secondary conveyor has an exit through which solids including liquid exit for further processing; the secondary conveyor including auger apparatus for moving the solids including liquid to the exit; a paddle on the auger apparatus for moving solids including liquid to the exit; secondary vibratory separator apparatus for receiving solids including liquid from the exit of the secondary conveyor and for treating the solids including liquid, the secondary vibratory separator apparatus for producing separated solids and for producing liquid for introduction back into the container; solids conveying apparatus for receiving the solids from the secondary vibratory separator apparatus and for conveying the solids away from the upflow vibratory separator; and/or the primary conveyor including a plurality of spaced-apart auger apparatuses for moving the solids away from the upflow vibratory separator.

The present invention, therefore, provides in certain, but not necessarily all embodiments, a vibratory separator system including a plurality of upflow vibratory separators, one adjacent the other, a common feed conduit for feeding material to be treated to the plurality of upflow vibratory separators, each upflow vibratory separator including a valve for selectively controlling the flow of the material to a corresponding upflow vibratory separator, each upflow vibratory separator as any upflow vibratory separator according to the present invention.

The present invention, therefore, provides in certain, but not necessarily all embodiments, a method for treating material with an upflow vibratory separator, the upflow vibratory separator as any disclosed herein according to the present invention with conveyor apparatus, the method including flowing the material to the primary screen assembly and with the primary screen assembly filtering out solids from the material, the solids flowing downwardly in the container, and vibrating a screen or screen assembly with non-motorized vibration apparatus.

Figure 17C:
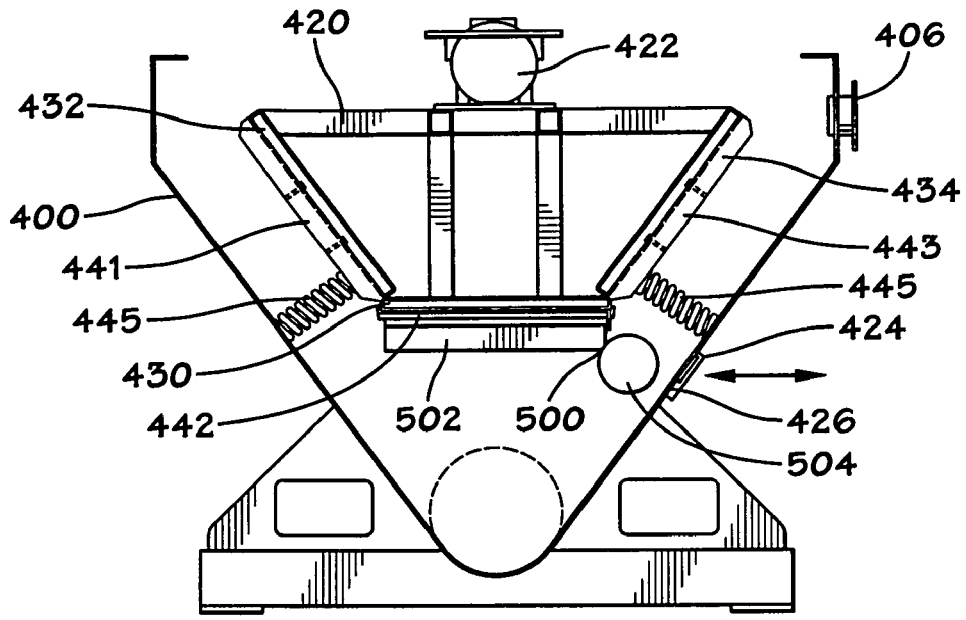
FIG. 17C is a cross-section view of a system according to the present invention.

FIG. 17C shows a box as in FIG. 17B (like numerals indicate like parts) but with an auxiliary vibratory apparatus 500 (e.g. any suitable apparatus with a suitable motor or motors) connected to the screen carrier 442 with or without isolation mounts. The vibratory apparatus 500 includes a vibrating member 502 (e.g. a plate) and a vibratory motor 504 for vibrating the vibratory member 502. Optionally, the motor(s) 422 is deleted. As with any box in any system herein, the box 420 may be suspended within its basket (e.g. see FIG. 23) or, as shown spring isolation mounts 445 (or any mounts disclosed in FIGS. 22A, 22B) may be used to mount the box in the basket. Alternately, the vibrating member is connected to the lower screen 430.

It is within the scope of the present invention for any screen carrier of any screen to have an auxiliary vibratory apparatus connected thereto or located adjacent thereto. Optionally the motor 422 is deleted.

Figure 18A:
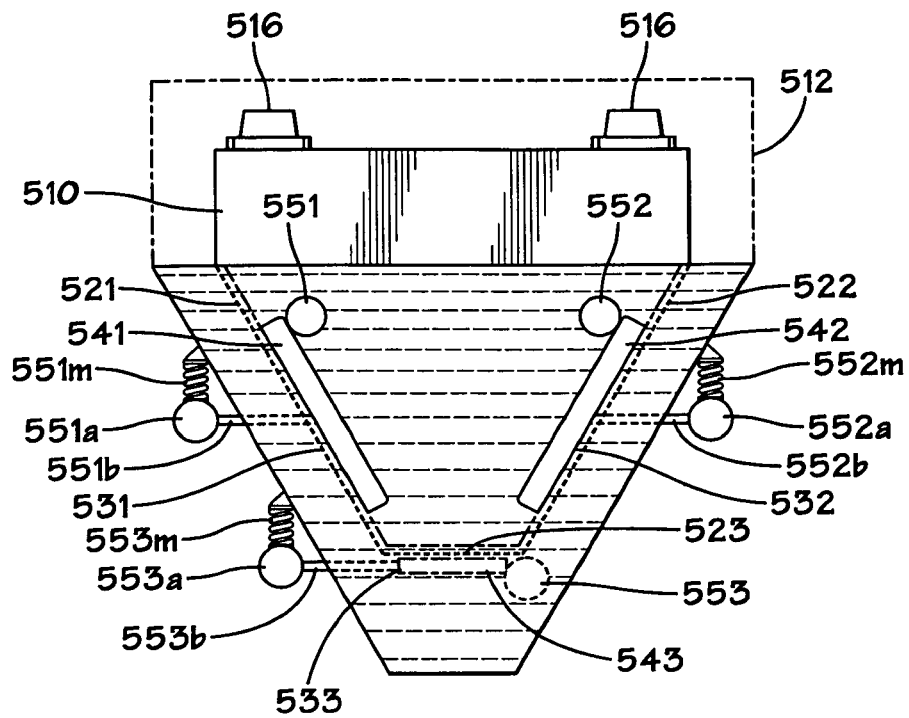
FIG. 18A is a cross-section view of a system according to the present invention.

FIG. 18A shows a box 510 according to the present invention in a basket 512 (e.g. as in the systems of FIGS. 7A, 8, 9A, 10A, 15 or 16). Connected to the box 510 are multiple screens, e.g. three to eight (on sides, bottom and ends). Three such screens are shown in FIG. 18A, screens 521, 522, and 523. Positioned adjacent each screen is a corresponding auxiliary vibratory apparatus 531, 532, 533, respectively, each with a vibrating member 541, 542, 543, respectively, and a corresponding vibrating motor 551, 552, 553. Optionally, the motors 551, 552, 553 (or one or two of them) which are immersed in fluid in the basket 512 are deleted and exterior motors 551*a*, 552*a*, and/or 553*a* are used connected to their respective vibrating members by shafts 551*b*, 552*b*, 553*b* extending sealingly through the basket 512. Isolation mounts 551*m*, 552*m*, and 553*m* are used to connect the motors 551*a*, 552*a*, 553*a* to the basket 512. Vibratory apparatuses 516 vibrate the box 510. One or the other apparatus 516 may be deleted.

Figure 18B:
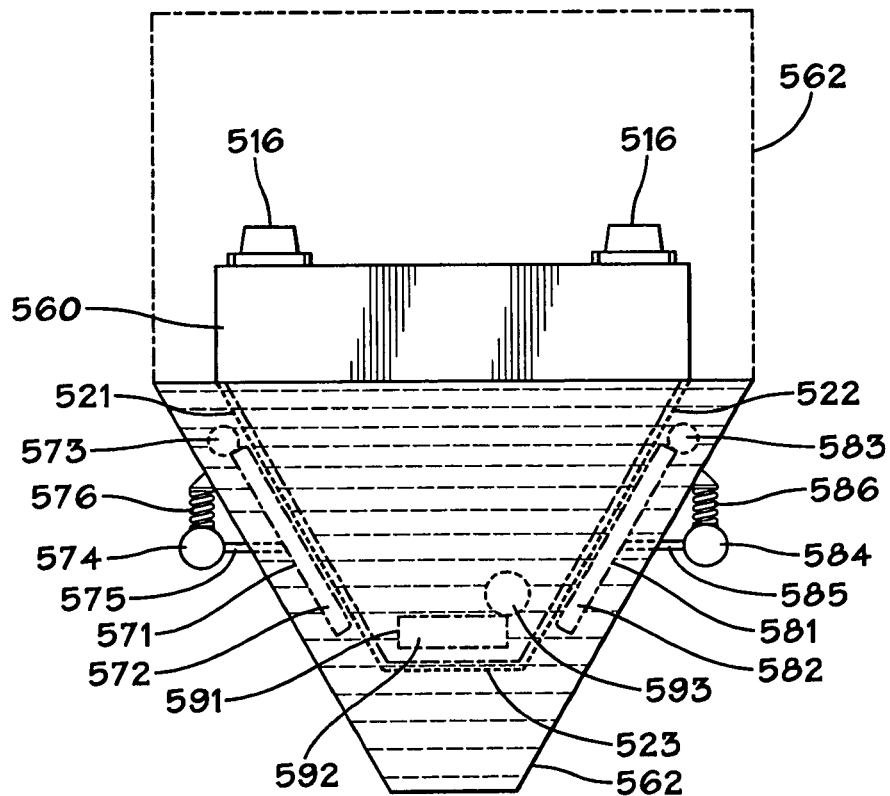
FIG. 18B is a cross-section view of a system according to the present invention.

FIG. 18B illustrates a box 560 similar to the box 510 (like numerals indicate like parts) in a basket 562, but with auxiliary vibratory apparatuses in different locations than in FIG. 18A. Associated with screen 521 is auxiliary vibratory apparatus 571 with vibrating member 572 and motor 573; and, optionally, with a motor 574 mounted exteriorly to a basket 513 with a shaft 575 sealingly extending through the basket 513 and connected to the vibrating member 572.

Associated with screen 522 is auxiliary vibratory apparatus 581 with vibrating member 582 and motor 583; and, optionally, with a motor 584 mounted exteriorly to the basket 562 with a shaft 585 sealingly extending through the basket 562 and connected to the vibrating member 582.

Associated with screen 523 is auxiliary vibratory apparatus 591 with vibrating member 592 and motor 593.

Figure 19A:
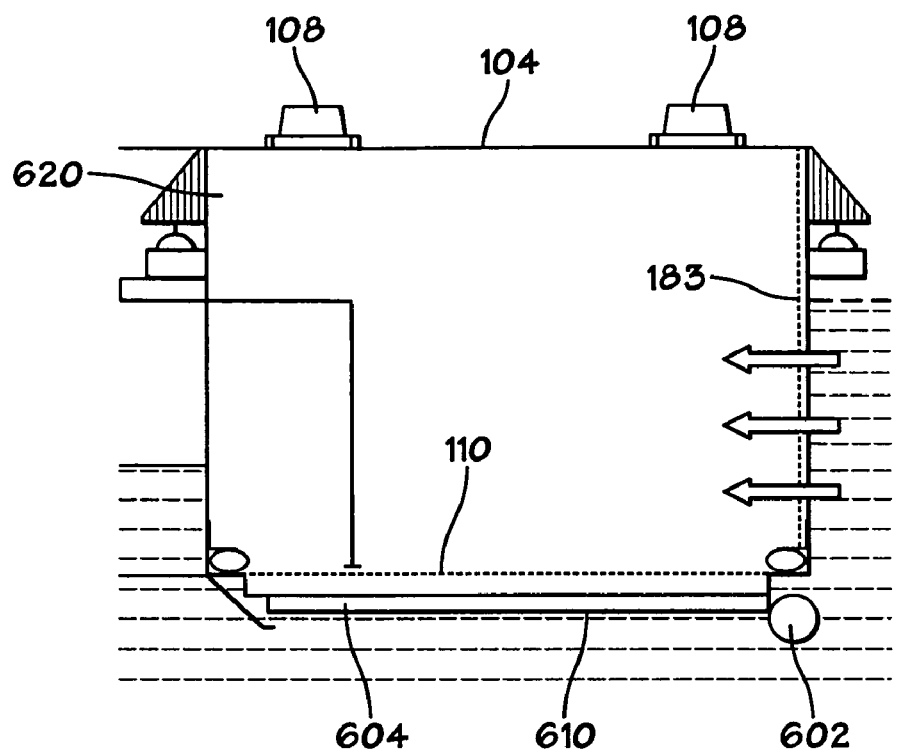
FIG. 19A is a side cross-section view of parts of a system according to the present invention.

FIG. 19A shows a box 600 like the box of, e.g. FIGS. 7A, 8, 9A, 10A, 13, 14, 15, or 16 (like numerals indicate like parts); but with an auxiliary vibratory apparatus 610 located beneath the screen 110. A motor 602 vibrates a vibrating member 604. The vibrating member 604 is substantially as long as the screen 110.

Figure 19B:
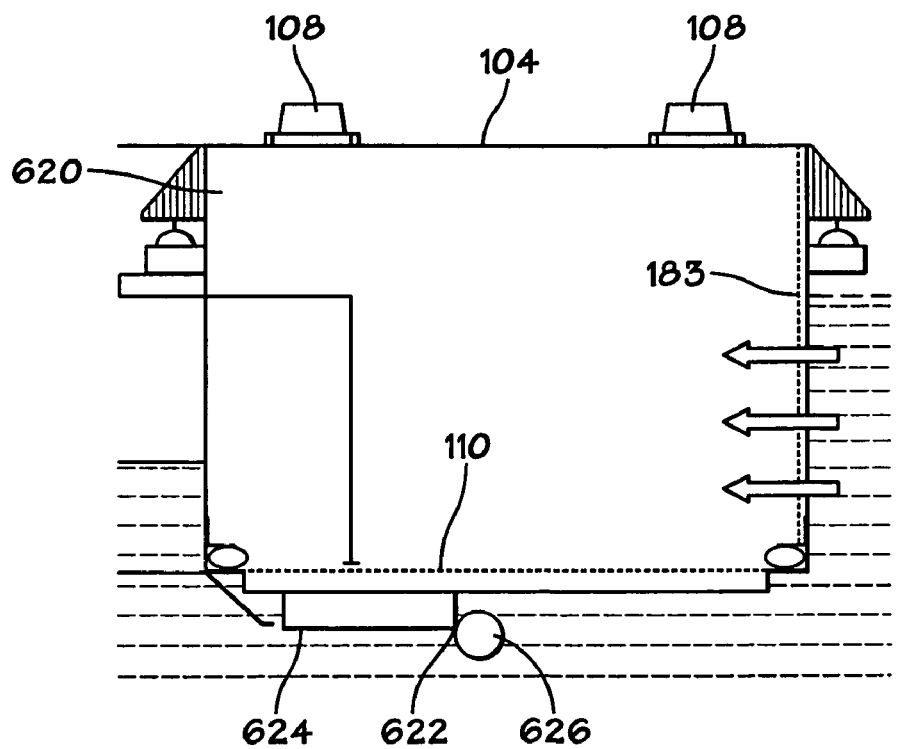
FIG. 19B is a side cross-section view of parts of a system according to the present invention.

The box 620 shown in FIG. 19B is like the box 600 (like numerals indicate like parts); but a vibrating member 624 of an auxiliary vibratory apparatus 622 extends for only a portion of the length of the screen 110. A motor 626 vibrates the vibrating member 624. Also, according to the present invention, a vibrating member of an auxiliary vibratory apparatus can be located anywhere with respect to a screen or part thereof and, in one particular aspect, at an area of higher flow.

Figure 20:
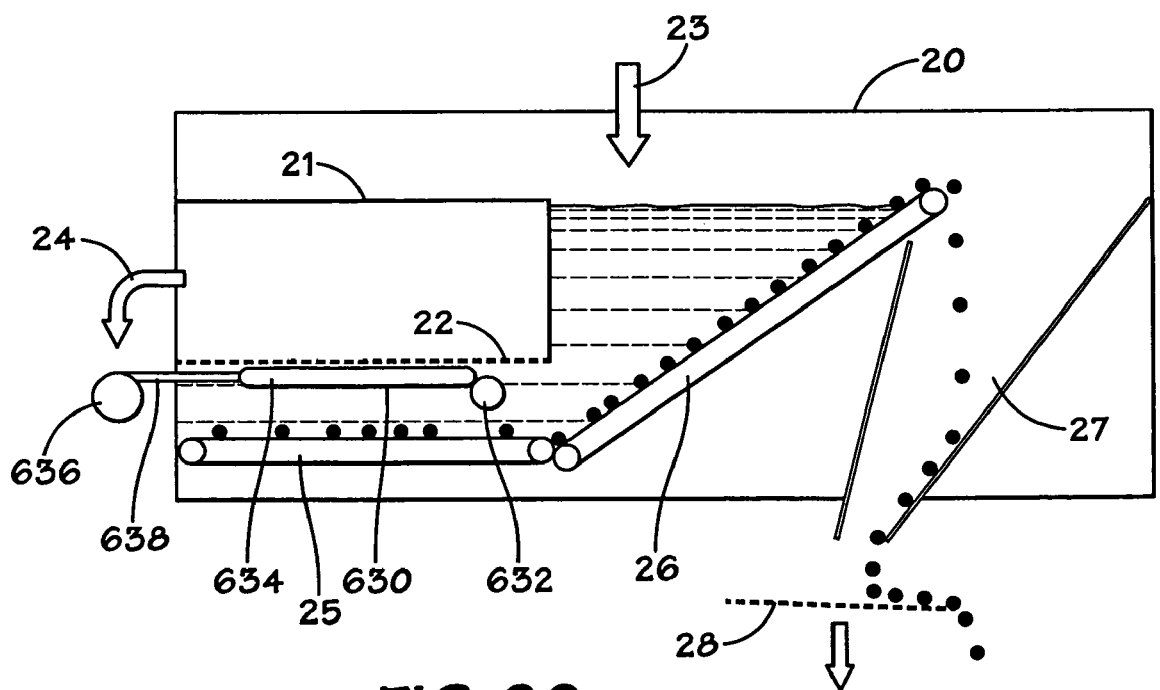
FIG. 20 is a side cross-section view of parts of a system according to the present invention.

FIG. 20 shows a system as in FIG. 5 (like numerals indicate like parts) and with an auxiliary vibratory apparatus 630 having a motor 632 that vibrates a vibrating member 634. Optionally a motor 636 positioned outside the enclosure 20 via a shaft 638 connected to the vibrating member 634 vibrates the vibrating member 634.

Figure 21A:
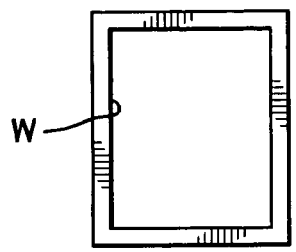
FIG. 21A is a top view of a vibratory member for systems according to the present invention.
Figure 21B:
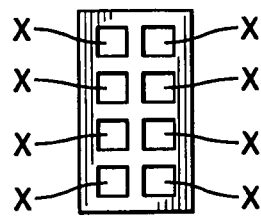
FIG. 21B is a top view of a vibratory member for systems according to the present invention.
Figure 21C:
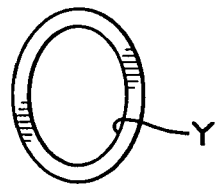
FIG. 21C is a top view of a vibratory member for systems according to the present invention.
Figure 21D:
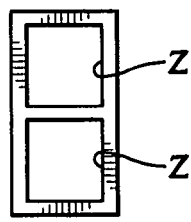
FIG. 21D is a top view of a vibratory member for systems according to the present invention.
Figure 21E:
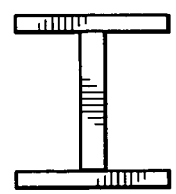
FIG. 21E is a top view of a vibratory member for systems according to the present invention.

A vibrating member for an auxiliary vibratory apparatus may be of any suitable shape, size, and configuration, including, but not limited to, any known perforated plate or frame with any number and shape of openings used with shale shaker screens, or any such member may be a solid. In certain aspects, a vibrating member according to the present invention has a shape as shown in FIGS. 21A-21E (shapes of the members as viewed from above) with opening w (FIG. 21A); openings x (FIG. 21B); opening y (FIG. 21C); and openings z (FIG. 21D).

Figure 22A:
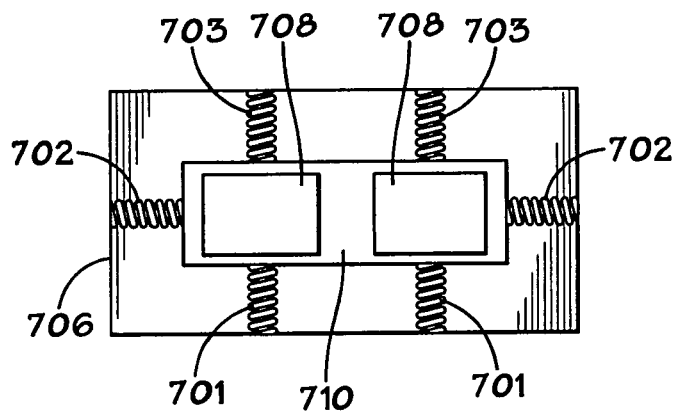
FIG. 22A is a side schematic view of a system according to the present invention.
Figure 22B:
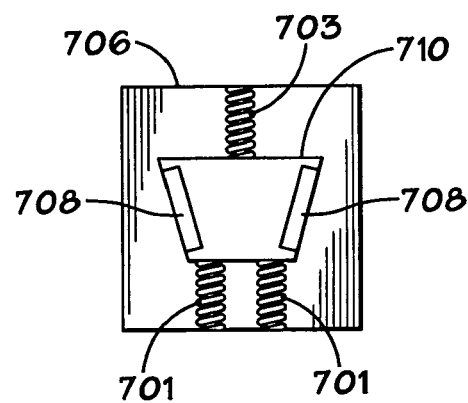
FIG. 22B is an end view of a system of FIG. 22A.

As shown in FIGS. 22A and 22B, spring isolation mounts 701, 702, 703 (or any combination of them) may be used to mount a box 710 (e.g. any screen supporting box with screens 708 in any embodiment of the present invention) in a basket 706. It is within the scope of the present invention to delete the mounts 701 and/or the mounts 702; or to delete the mounts 703 and/or the mounts 702.

Figure 23:
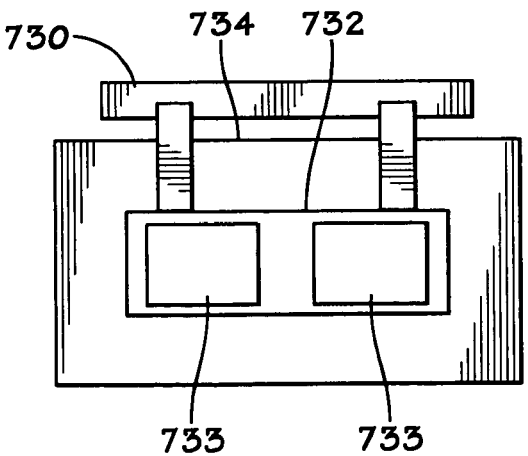
FIG. 23 is a side schematic view of a system according to the present invention.

As shown in FIG. 23, a suspension structure 730 may be used to suspend any screen-supporting box in any system according to the present invention within a basket. A box 732 with screens 733 is secured to the suspension structure 730 (which is not connected to a basket 734 in which the box is positioned).

The present invention, therefore, provides in certain, but not necessarily all embodiments, a vibratory separator system (or shale shaker) having: a basket for containing material to be treated by vibratory action, the material containing liquid and solids; a screening apparatus in the basket for screening solids from the material, the screening apparatus including a screen support and at least one screen through which liquid in the material is passable and through which solids in the material are not passable; a first vibratory apparatus secured to the screen support for vibrating the screen support and thereby vibrating the at least one screen; and a second vibratory apparatus connected to the at least one screen for vibrating the at least one screen. Such a system may include one or some, in any possible combination, of the following: wherein the material is drilling material, the liquid is drilling fluid, and the solids are drilling solids entrained in the drilling fluid, and the vibratory separator system is a shale shaker; wherein the at least one screen includes at least one upper screen, and at least one lower screen, the at least one lower screen located lower in the basket than the upper screen, the second vibratory apparatus connected to the at least one lower screen; wherein the second vibratory apparatus includes a vibrating member contacting the at least one lower screen, and a motor connected to the vibrating member for vibrating the vibrating member (solid or with openings through it) to vibrate the at least one lower screen; wherein the screen support has side walls and a bottom, the at least one screen includes at least one upper screen above the bottom of the screen support, and the second vibratory apparatus is connected to the at least one upper screen; wherein the second vibratory apparatus is in the basket and mounted exteriorly of the screen support; wherein the second vibratory apparatus is within the screen support; wherein the second vibratory apparatus includes a first vibrator and a second vibrator, the at least one screen includes at least two screens including a first screen and a second screen, the first vibrator within the screen support and adjacent the first screen, the second vibrator mounted exteriorly of the screen support and adjacent the second screen; wherein the second vibratory apparatus includes a motor for vibrating a screen, the motor mounted exteriorly of the basket, a shaft extending through the basket and connected to the motor and to the at least one screen for transferring vibratory action from the motor to the at least one screen to vibrate the at least one screen; wherein the at least one screen includes a plurality of screens, the second vibratory apparatus includes a plurality of motors and associated vibrating members, and one motor and vibrating member for vibrating each screen of the plurality of screens; wherein material to be treated flows up to the at least one screen and liquid in the material flows up and through the at least one screen, and solids in the material contact and do not flow through the at least one screen, at least part of the basket disposed beneath the at least one screen; wherein the screening apparatus is mounted in the basket on at least one spring isolation mount, the at least one spring isolation mount connected to the basket; wherein the at least one spring isolation mount is a plurality of spring isolation mounts; support structure for supporting the screening apparatus, the screening apparatus connected to the support structure, and the screening apparatus disposed within but free of contact with the basket; wherein the basket includes a first area of higher flow of liquid than in a second area, the at least one screen includes a first screen, the first screen is at the first area of higher flow, the second vibratory apparatus includes a vibrating member, the vibrating member positioned adjacent the first screen; the second vibratory apparatus includes a vibrating member and a motor to vibrate the vibrating member; wherein the vibrating member has a periphery and at least one opening therethrough; and/or wherein the at least one opening is a plurality of spaced-apart openings.

The present invention, therefore, provides in certain, but not necessarily all embodiments, a shale shaker having: a basket for containing material to be treated by vibratory action, the material containing liquid and solids; a screening apparatus in the basket for screening solids form the material, the screening apparatus including a screen support and at least one screen through which liquid in the material is passable and through which solids in the material are not passable; a first vibratory apparatus secured to the screen support for vibrating the screen support and thereby vibrating the at least one screen; a second vibratory apparatus connected to the at least one screen for vibrating the at least one screen; the material is drilling material, the liquid is drilling fluid, and the solids are drilling solids entrained in the drilling fluid; and the screening apparatus is mounted in the basket on at least one spring isolation mount, the at least one spring isolation mount connected to the basket.

Figure 24A:
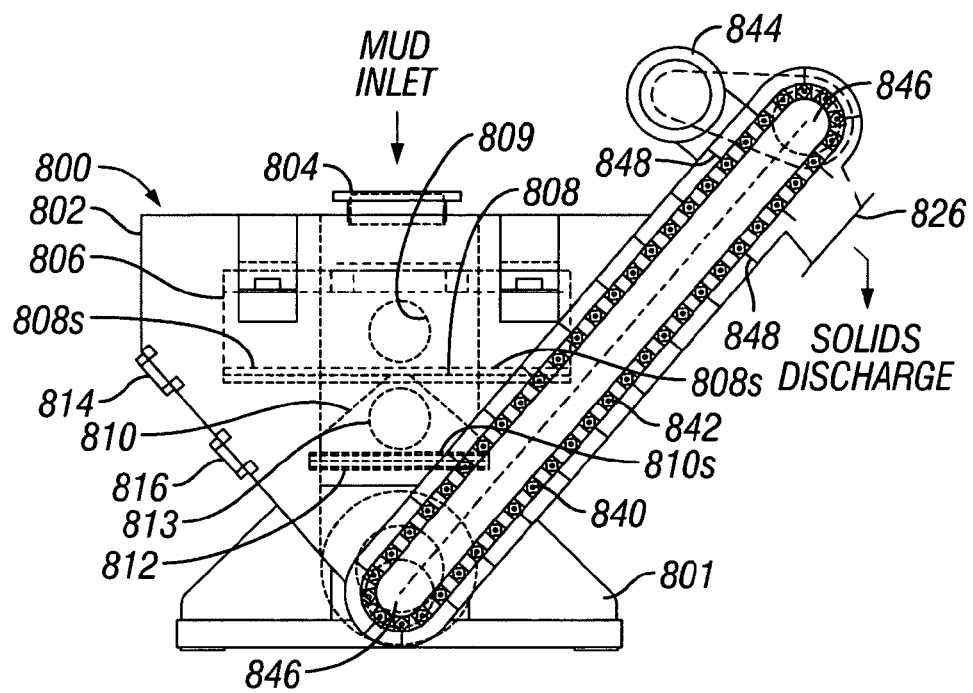
FIG. 24A is an end cross-section view of a system according to the present invention.
Figure 24B:
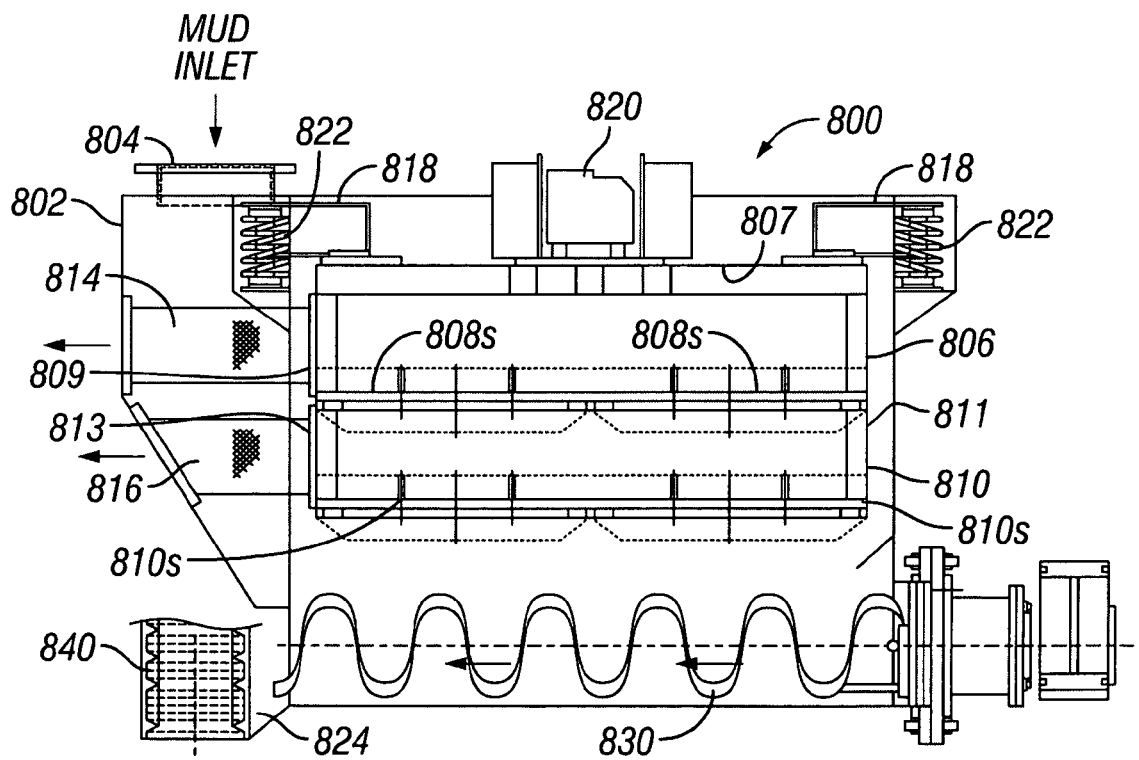
FIG. 24B is a side cross-section view of the system of FIG. 24A.

FIGS. 24A and 24B show a system 800 according to the present invention which has a container 802 on a base 801 with an inlet 804 ("MUD INLET") for a mixture of drilling fluid and solids (e.g. debris, drilled cuttings, and/or drilling fluid additives, e.g., but not limited to, barite, bentonite, and lost circulation material). Two boxes 806, 810 are located in the container 802.

The top box 806 has a hollow body 807, a screening apparatus 808, and a drilling fluid exit port 809. The bottom box 810 is connected to the top box 806 and has a hollow body 811, a screening apparatus 812, and a drilling fluid exit port 813. The exit port 809 is in fluid communication with fluid outlet 814 and the exit port 813 is in fluid communication with a fluid outlet 816. The screening apparatuses 808, 812 are substantially horizontal.

Brackets 818 connected to the box 806 are connected to vibration isolation springs 822 which are connected to the container 802. A vibrator 820 connected to the top of the box 806 vibrates the boxes 806, 810 and their screening apparatuses. The vibrator 820 primarily vibrates only the boxes 806, 810 and their screening apparatuses with little, if any, vibration imparted to the container 802.

Solids which do not pass through the screening apparatuses 808, 812 fall down within the container 802 and are augured by an auger apparatus 830 to a conveyor 840 through an exit opening 824. The auger apparatus 830 may be any auger apparatus disclosed or referred to herein.

In one aspect, the conveyor 840 has a chain belt 842 movable by motor apparatus 844 on sprockets 846. A plurality of spaced-apart paddles 848 projecting from the chain belt 842 pick up solids augured through the opening 824 and move the solids away from the opening 824 and up to a solids discharge outlet 826 ("SOLIDS DISCHARGE"). The solids moved through the opening 824 and to the outlet 826 will be wet to some degree.

The screening apparatuses 808,812 may have any screens disclosed herein. As shown in FIGS. 24A and 24B, the screening apparatus 808 includes four screens 808s and the screening apparatus 810 includes two screens 810s.

FIGS. 25A-27C illustrate systems like the system 800 (FIGS. 24A, 24B; like numerals indicate like parts); but with different screening apparatuses shown schematically. The systems of FIGS. 25A-28H have a vibrator, a fluid outlet, and screens with fluid exit port(s), e.g. as in FIGS. 24A, 24B. Also, the screens are mounted to a container with vibration isolator(s) as in FIGS. 24A, 24B.

Figure 25A:
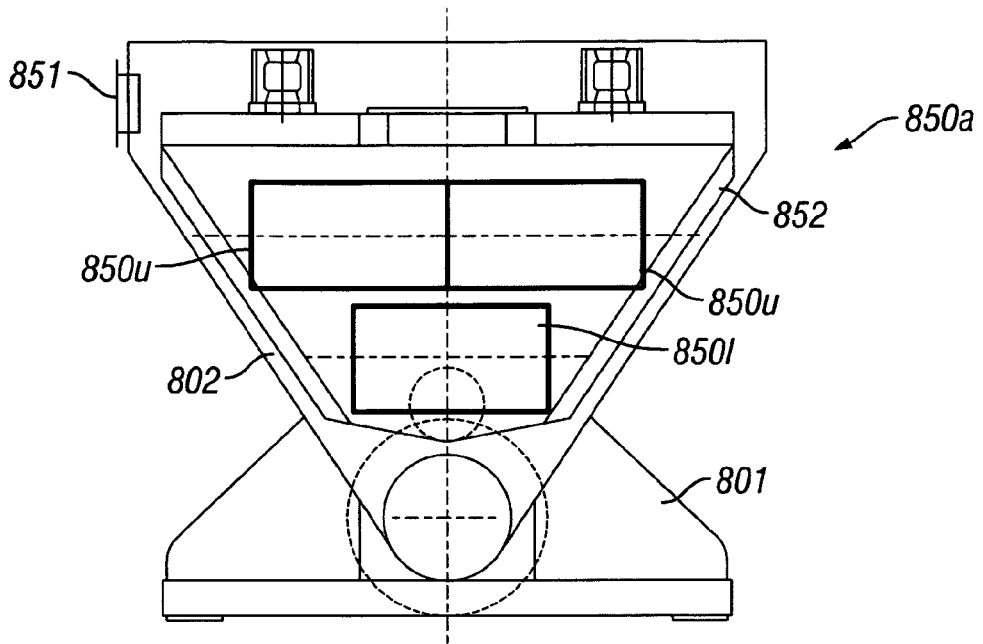
FIG. 25A is an end cross-section view of a system according to the present invention.
Figure 25B:
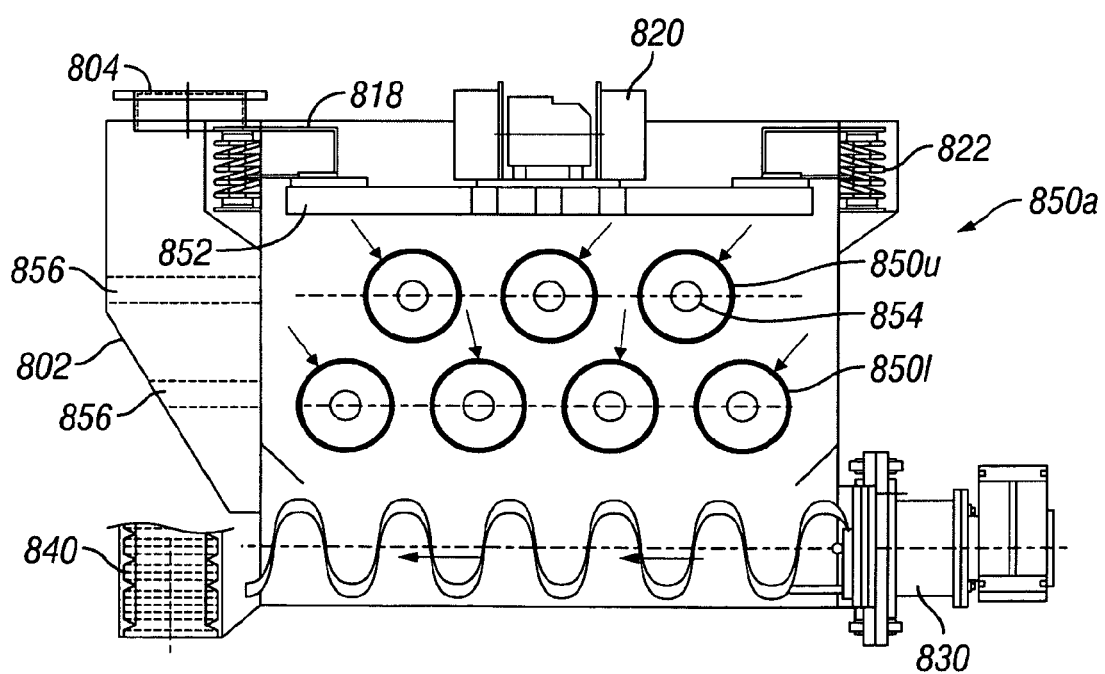
FIG. 25B is a side cross-section view of the system of FIG. 25A.
Figure 26A:
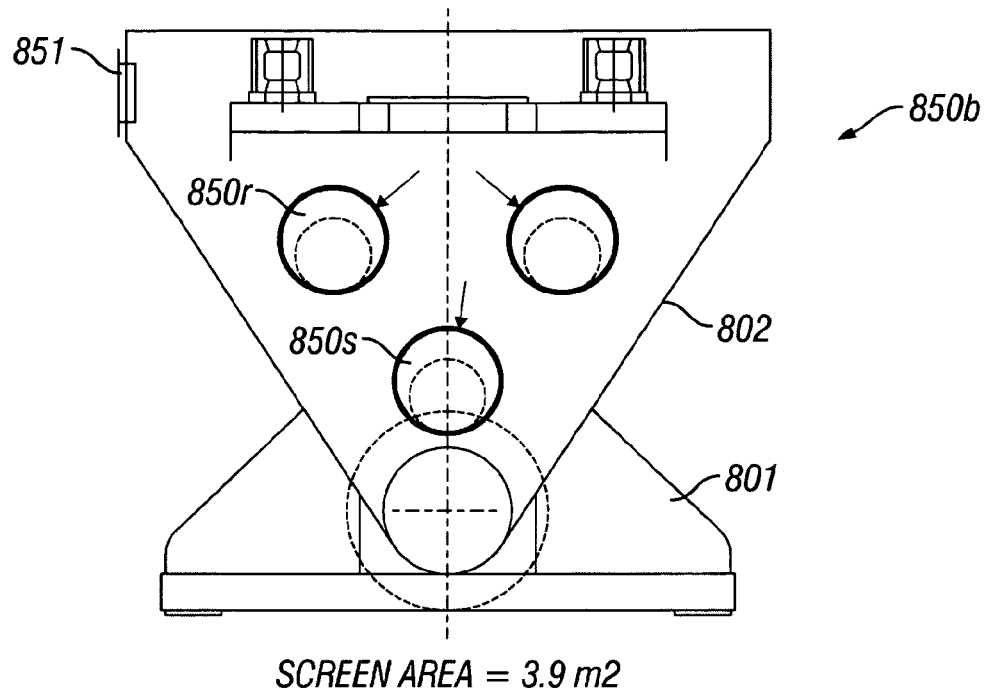
FIG. 26A is an end cross-section view of a system according to the present invention.
Figure 26B:
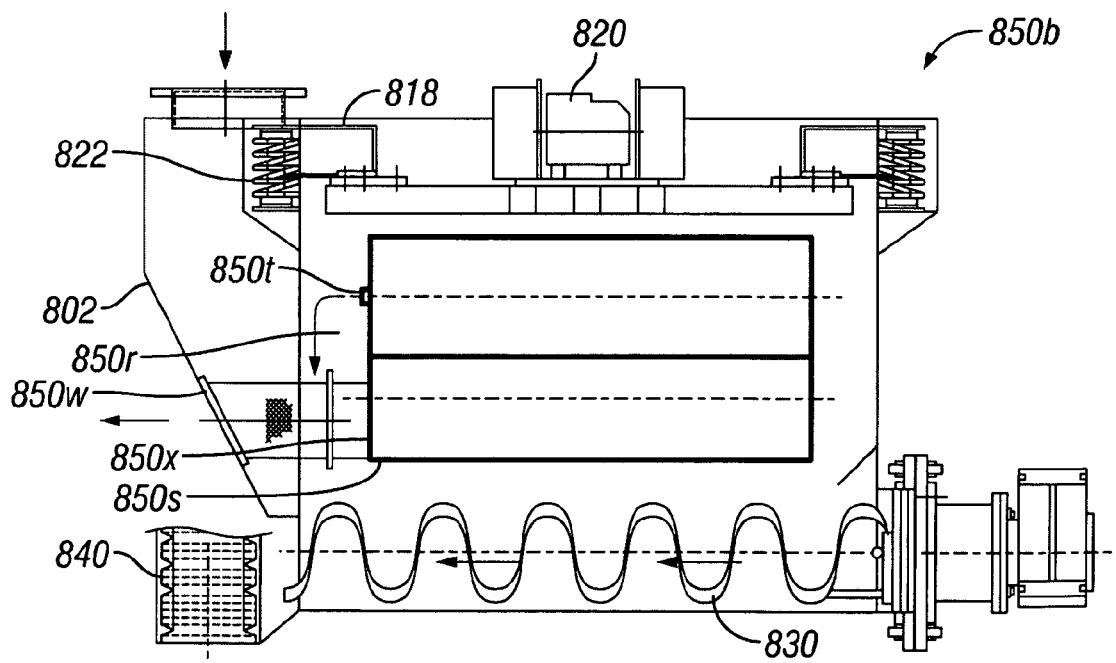
FIG. 26B is a side cross-section view of the system of FIG. 25A.

As shown in FIGS. 25A and 25B a system 800a has screening apparatuses 850 connected to a support structure 852. As may any container herein, the container in FIG. 25A has an overflow outlet 851.

There are six upper screens 850u and eight lower screens 850l. Fluid enters the screens from all sides. As viewed from the side (FIG. 25B) the screens have a circular cross-section and, as viewed from the end (FIG. 25A), the screens have a rectangular cross-section. (The screens of FIG. 25A have a total screen area for all fourteen screens of 3.9 square meters.)

FIGS. 25A-27C illustrate systems like the system 800 (FIGS. 24A, 24B; like numerals indicate like parts); but with different screening apparatuses shown schematically. The systems of FIGS. 25A-28H have a vibrator, a fluid outlet, and screens with fluid exit port(s), e.g. as in FIGS. 24A, 24B. Also, the screens are mounted to a container with vibration isolator(s) as in FIGS. 24A, 24B.

As shown in FIGS. 25A and 25B a system 850a has screening apparatuses 850u, 850l connected to a support structure 852. As may any container herein, the container in FIG. 25A has an overflow outlet 851.

There are two upper screens 850r and one lower screen 850n. Fluid enters the screens from all sides. As viewed in FIG. 26A, the screens have a circular cross-section. The system of FIG. 26A has a total screen area of 3.9 square meters.

Figure 27A:
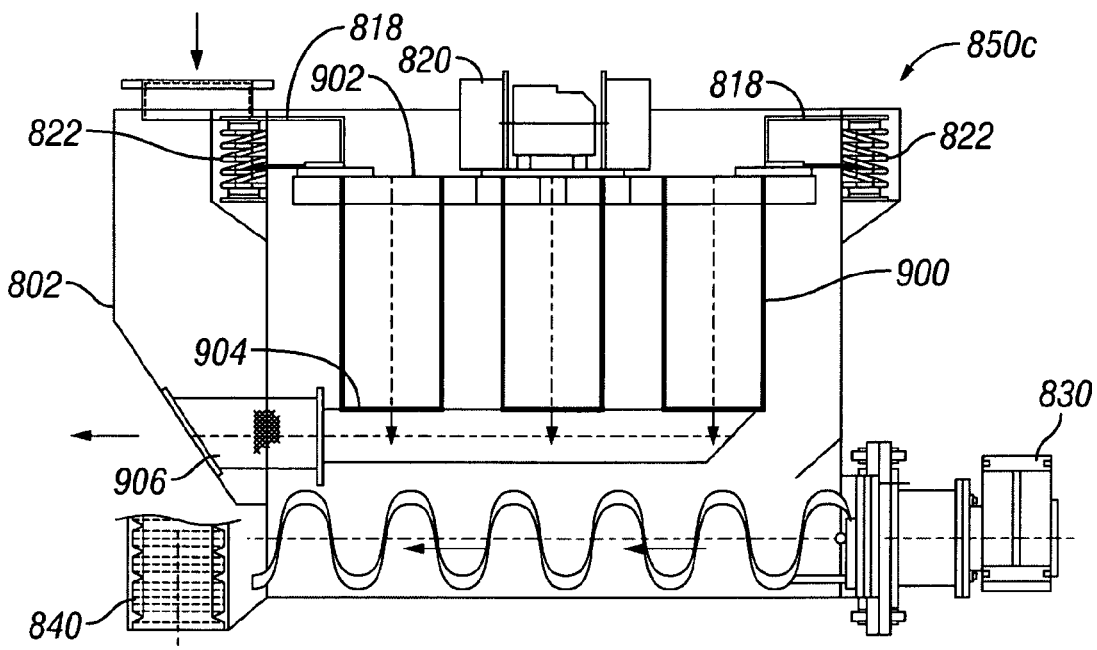
FIG. 27A is a side cross-section view of a system according to the present invention.
Figure 27B:
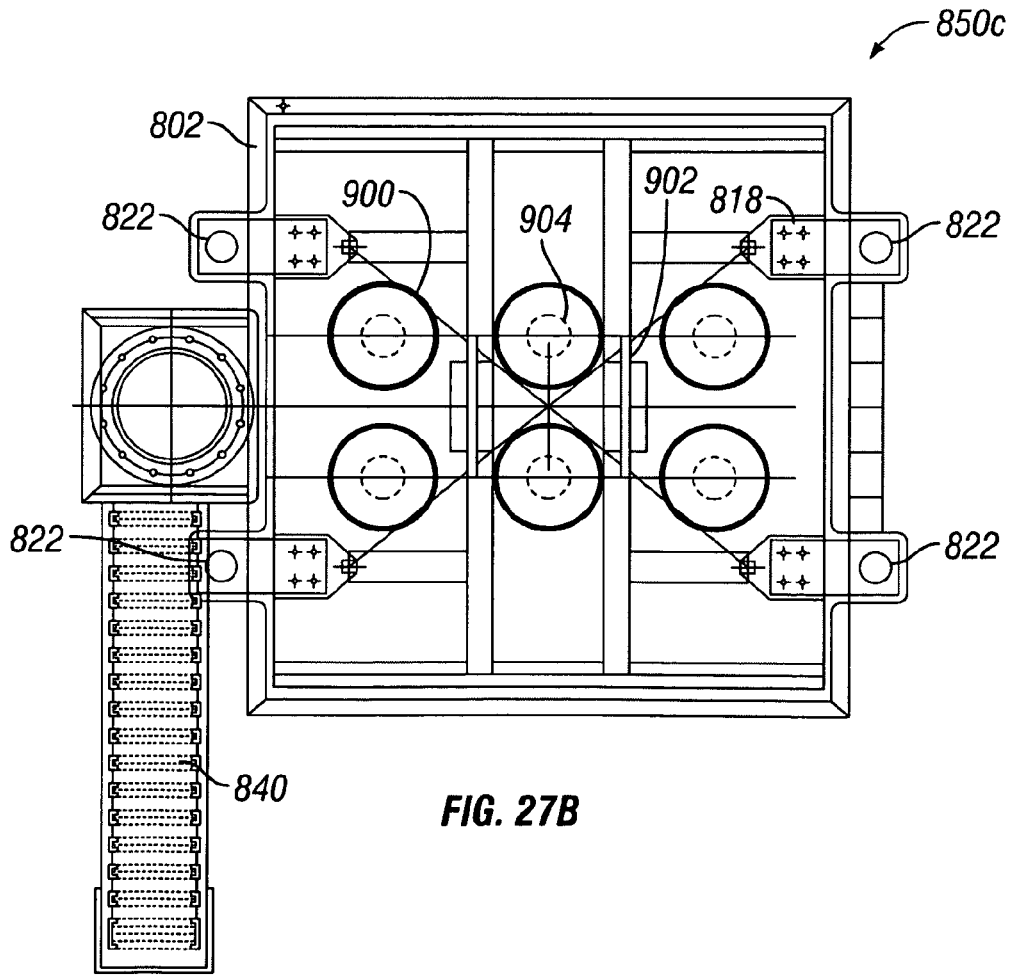
FIG. 27B is a top cross-section view of the system of FIG. 27A.
Figure 27C:
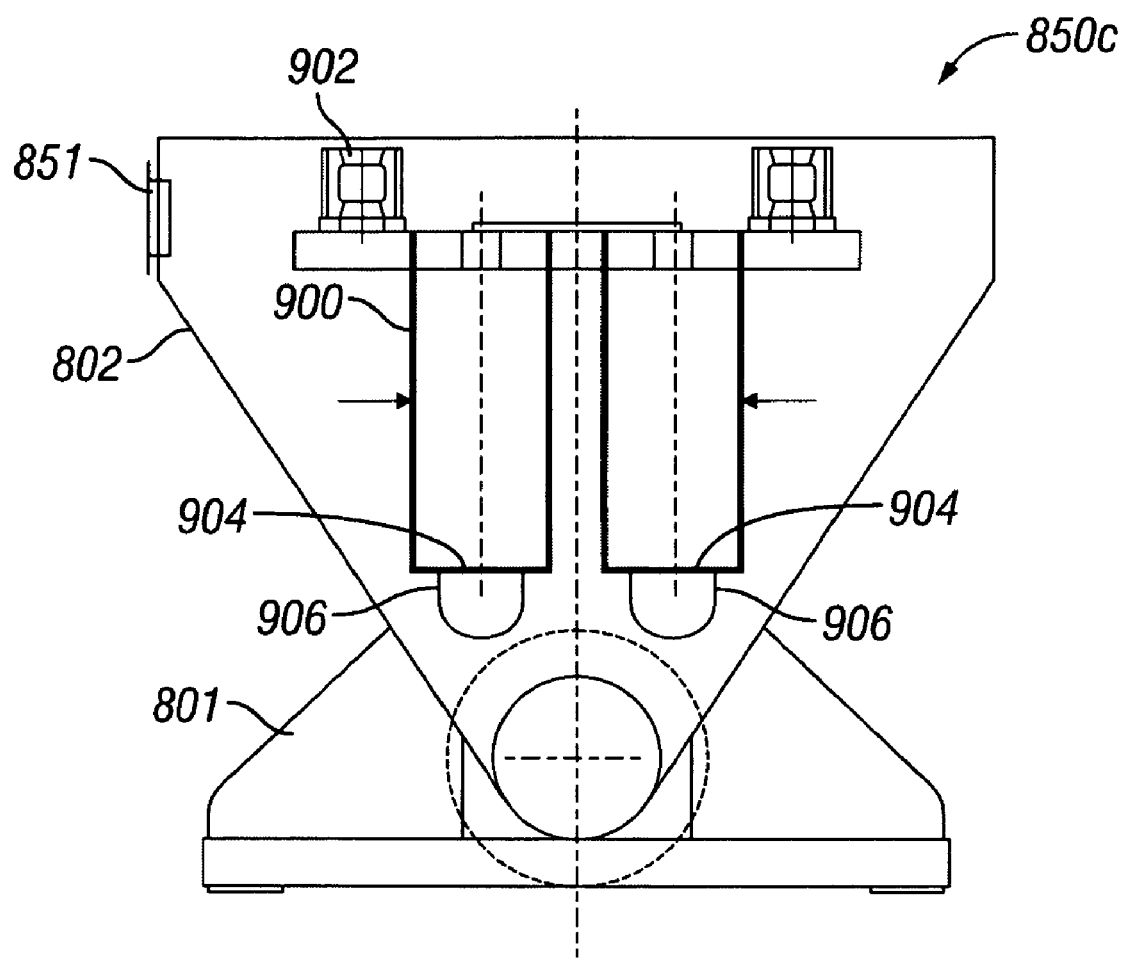
FIG. 27C is an end cross-section view of the system of FIG. 27A.

As shown in FIGS. 27A-27C, a system 850c has screening apparatuses 900 connected to a support structure 902.

There are six cylindrical screen apparatuses 900. Fluid enters the screen apparatuses 900 from all sides.

Each screen apparatus 900 has a fluid exit port 904 in fluid communication with a fluid outlet 906. The total screen area for the system of FIG. 27A is 3.4 square meters.

FIGS. 28A-28H illustrate various boxes and screening apparatuses for systems according to the present invention. Each of the boxes in these figures is in a container 882 (like the container 802 or any container herein) on a base 881 (like the base 801 or any base herein). Each box is vibratable by a vibrator (not shown; like the vibrator 820 or any vibrator herein). Each of FIGS. 28A-28H has a label with a measurement of screen area ("SCREEN AREA") which indicates the total screen area of all the screens for that particular system in square meters. Each box is connected to a support structure (like the support structure 852 or any support structure herein). The screens in each figure are connected to a box. The boxes in FIGS. 28A, 28B, 28C, 28D, 28G, and 28H have a fluid exit port 912 (see, e.g. FIG. 28C) in communication with a system fluid outlet 914 (e.g., see FIG. 28C) and each of the screens with a hollow interior has a fluid exit port in fluid communication with the system fluid outlet.

Figure 28B:
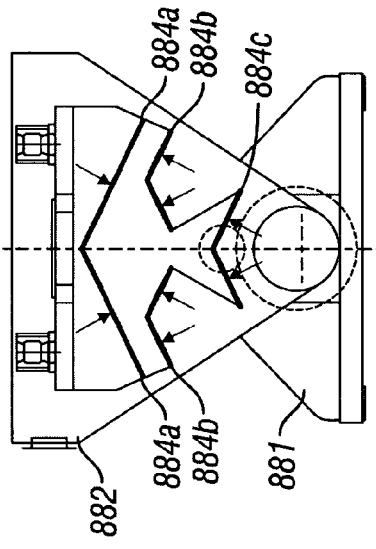
FIG. 28B is a cross-section view of a system according to the present invention.
Figure 28D:
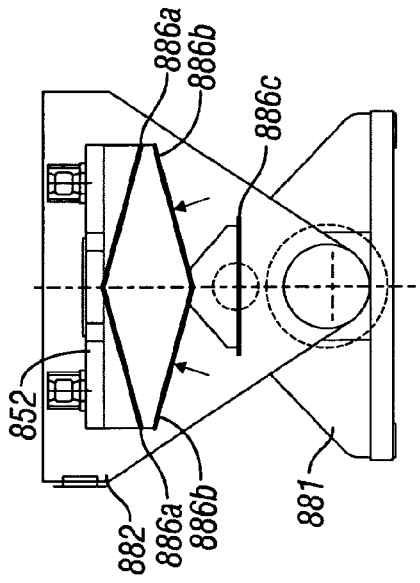
FIG. 28D is a cross-section view of a system according to the present invention.
Figure 28A:
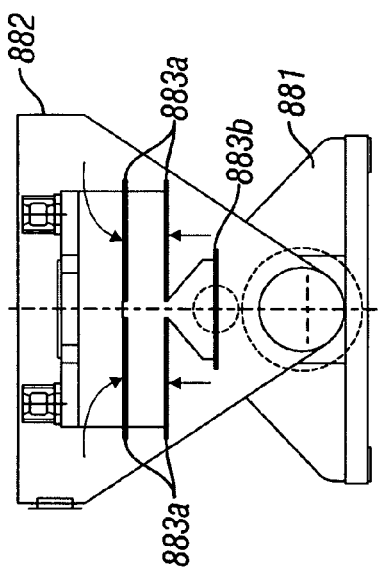
FIG. 28A is a cross-section view of a system according to the present invention.
Figure 28C:
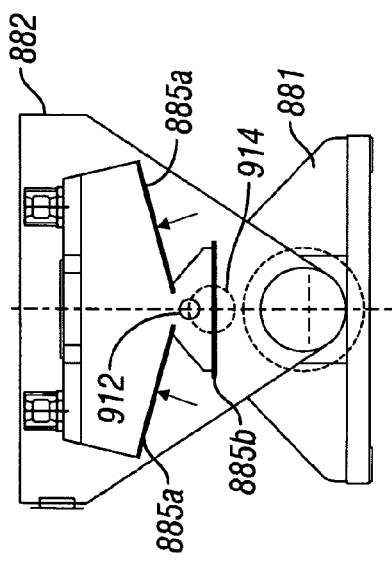
FIG. 28C is a cross-section view of a system according to the present invention.
Figure 28E:
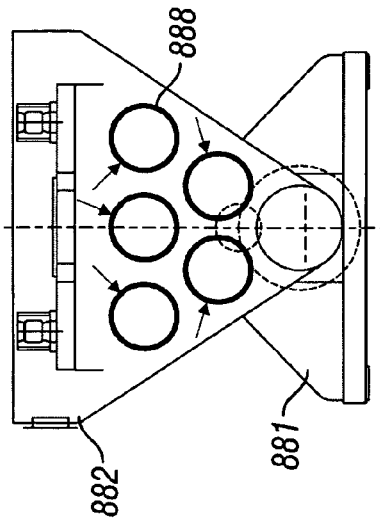
FIG. 28E is a cross-section view of a system according to the present invention.
Figure 28F:
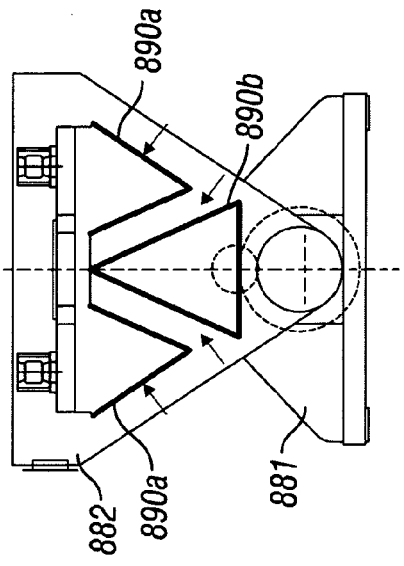
FIG. 28F is a cross-section view of a system according to the present invention.
Figure 28G:
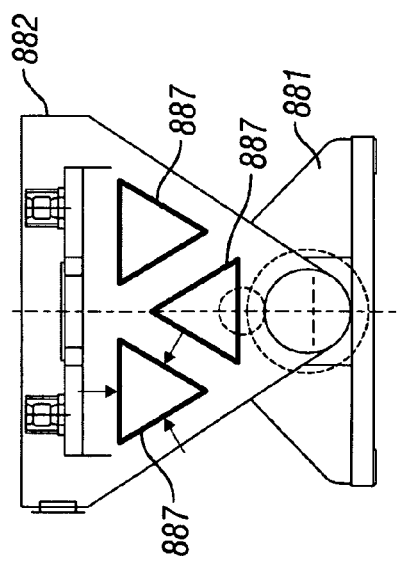
FIG. 28G is a cross-section view of a system according to the present invention.
Figure 28H:
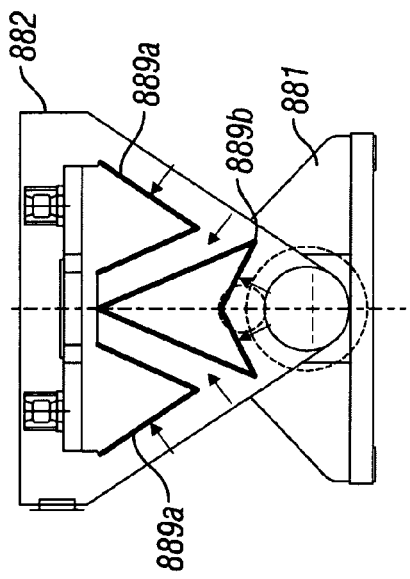
FIG. 28H is a cross-section view of a system according to the present invention.

The bold or darker black lines in each of the FIGS. 28A-28H indicate individual screens as follows:
FIG. 28A: screens 883a, 883b
FIG. 28B: screens 884a, 884b, 884c
FIG. 28C: screens 885a, 885b
FIG. 28D: screens 886a, 886b, 886c
FIG. 28E: screens 887
FIG. 28F: screens 888
FIG. 28G: screens 889a, 889b
FIG. 28H: screens 890a, 890b Each of the screens 887, 888, 889b, and 890b are separate cartridge screens with a hollow interior. Each of the screens 883a, 883b, 884a, 884b, 884c, 885a, 885b, 886a, 886b, 886c, 889a, and 890a does not have a hollow interior completely surrounded by screening material (as is true of the screens listed in the previous sentence).

The present invention, therefore, provides, in at least some, but not necessarily all, embodiments a system for vibratory separation of components of a material fed to the vibratory separator, the systems including: a container into which material is feedable, the material including components to be separated by vibratory separation, the components including solids; a box within the container; vibratory isolation apparatus connected to the container, the box connected to the vibratory isolation apparatus; screening apparatus connected to the box for screening the material to separate solids from the material; the screening apparatus including a plurality of spaced-apart screening cartridges connected to the box, each cartridge having at least one fluid exit port from which fluid separated from the material by the screening cartridge passes from the screening cartridge; a vibrator connected to the box for vibrating the screening cartridges; and the container having a fluid outlet from which separated fluid from the at least one fluid exit port of each screening cartridge flows from the system. Such a system may include one or some, in any possible combination, of the following: auger apparatus beneath the screening apparatus for receiving solids not passing through the screening apparatus and for moving said solids from the system; conveyor apparatus adjacent the auger apparatus for receiving said solids from the auger apparatus and for conveying said solids from the auger apparatus; the conveyor apparatus including a belt, a plurality of spaced-apart paddles on the belt for picking up said solids augured by the auger apparatus and for moving said solids to a discharge outlet, and motor apparatus connected to the belt for moving the belt; the plurality of spaced-apart cartridges including at least one cartridge at a first level within the box and at least one cartridge at a second level within the box, the first level different from the second level; wherein the screening cartridges, viewed on end, have a cross-section which is one of triangular, rectangular, and circular; wherein the screening cartridges are generally cylindrical; wherein the generally cylindrical screening cartridges are upright; wherein the generally cylindrical screening cartridges are horizontal; wherein the cartridges are configured and located for impact by material flowing at any direction to the cartridge; and/or wherein said any direction includes from below and from a side.

The present invention, therefore, provides, in at least some, but not necessarily all, embodiments a system for vibratory separation of components of a material fed to the vibratory separator, the system including: a container into which material is feedable, the material including components to be separated by vibratory separation, the components including solids; a box within the container; vibratory isolation apparatus connected to the container, the box connected to the vibratory isolation apparatus; screening apparatus connected to the box for screening the material to separate solids from the material; the screening apparatus including a plurality of spaced-apart screening cartridges connected to the box, each cartridge having at least one fluid exit port from which fluid separated from the material by the screening cartridge passes from the screening cartridge; a vibrator connected to the box for vibrating the screening cartridges; the container having a fluid outlet from which separated fluid from the at least one fluid exit port of each screening cartridge flows from the system; the box having sides and box interior defining an enclosed space; a plurality of screens on the box positioned so that fluid from the material is flowable from outside the box to the box interior through one of the screens; and the box having a box fluid exit from which fluid within the box is flowable to the fluid outlet of the container. Such a system may include one or some, in any possible combination, of the following: wherein screens are positioned on the box for intercepting material flowing upward within the container; auger apparatus beneath the screening apparatus for receiving solids not passing through the screening apparatus and for moving said solids from the system, conveyor apparatus adjacent the auger apparatus for receiving said solids from the auger apparatus and for conveying said solids from the auger apparatus, the conveyor apparatus including a belt, a plurality of spaced-apart paddles on the belt for picking up said solids augured by the auger apparatus and for moving said solids to a discharge outlet, and motor apparatus connected to the belt for moving the belt; and/or wherein the plurality of spaced-apart cartridges includes at least one cartridge at a first level within the box and at least one cartridge at a second level within the box, the first level different from the second level.

The present invention, therefore, provides, in at least some, but not necessarily all, embodiments a system for vibratory separation of components of a material fed to the vibratory separator, the system having: a container into which material is feedable, the material including components to be separated by vibratory separation, the components including solids; a box within the container, the box connected to the container via vibratory isolation apparatus; screening apparatus connected to the box for screening the material to separate solids from the material; the screening apparatus including a plurality of spaced-apart screens connected to the box; a vibrator connected to the box for vibrating the screens; the container having a fluid outlet from which separated fluid from each screen flows from the system; and the screens including at least one first screen at a first level and at least one second screen at a second level, the first level different from the second level. Such a system may include one or some, in any possible combination, of the following: the at least one second screen having sides defining a hollow interior, and a portion of the at least one second screen projecting to the first level adjacent a portion of the at least one first screen so that a path is defined between said portion and said at least one first screen; the at least one first screen is two spaced-apart screens and said portion of the at least one second screen is positioned between the two spaced-apart first screens with a path defined between said portion and each of said two spaced-apart first screens; wherein said at least one second screen has a triangular cross-section; and/or wherein said at least one first screen has a hollow interior defined by screening material.

The present invention, therefore, provides, in at least some, but not necessarily all, embodiments a method for separating components of a material, at least one of said components including fluid, the method including feeding material to a system for vibratory separation, the system as any according to the present invention; and separating fluid from the material with screening apparatus or apparatuses of the system.

In conclusion, therefore, it is seen that the present invention and the embodiments disclosed herein are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims. All patents and applications identified herein are incorporated fully herein for all purposes. It is the express intention of the applicant not to invoke 35 U.S.C. §112, paragraph 6 for any limitations of any of the claims herein, except for those in which the claim expressly uses the words 'means for' together with an associated function. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

What is claimed is:

1. A system for vibratory separation of components of a material fed to the vibratory separator, the system comprising
  a container into which material is feedable, the material including components to be separated by vibratory separation, the components including solids,
  a box within the container,
  vibratory isolation apparatus connected to the container, the box connected to the vibratory isolation apparatus,
  screening apparatus connected to the box for screening the material to separate solids from the material,
  the screening apparatus including a plurality of spaced-apart screening cartridges connected to the box, each cartridge having at least one fluid exit port from which fluid separated from the material by the screening cartridge passes from the screening cartridge,
  a vibrator connected to the box for vibrating the screening cartridges, and
  the container having a fluid outlet from which separated fluid from the at least one fluid exit port of each screening cartridge flows from the system.

2. The system of claim 1 further comprising
  auger apparatus beneath the screening apparatus for receiving solids not passing through the screening apparatus and for moving said solids from the system.

3. The system of claim 2 further comprising
  conveyor apparatus adjacent the auger apparatus for receiving said solids from the auger apparatus and for conveying said solids from the auger apparatus.

4. The system of claim 3 wherein
  the conveyor apparatus includes
    a belt,
    a plurality of spaced-apart paddles on the belt for picking up said solids augured by the auger apparatus and for moving said solids to a discharge outlet, and
    motor apparatus connected to the belt for moving the belt.

5. The system of claim 1 wherein
  the plurality of spaced-apart cartridges includes at least one cartridge at a first level within the box and at least one cartridge at a second level within the box,
  the first level different from the second level.

6. The system of claim 1 wherein the screening cartridges, viewed on end, have a cross-section which is one of triangular, rectangular, and circular.

7. The system of claim 1 wherein the screening cartridges are generally cylindrical.

8. The system of claim 7 wherein the generally cylindrical screening cartridges are upright.

9. The system of claim 7 wherein the generally cylindrical screening cartridges are horizontal.

10. The system of claim 1 wherein the cartridges are configured and located for impact by material flowing at any direction to the cartridge.

11. The system of claim 10 wherein said any direction includes from below and from a side.

12. The system of claim 1, wherein at least one of said plurality of screening cartridges comprises an interior cartridge region.

13. The system of claim 12, wherein said interior cartridge region is defined by a screen surface of said at least one of said plurality of screening cartridges.

14. The system of claim 12, wherein said at least one of said plurality of screening cartridges is adapted to permit a flow of at least a portion of said material from said box to said interior cartridge region.

15. The system of claim 12, wherein said at least one exit port of said at least one of said plurality of screening cartridges is in fluid communication with said interior cartridge region and said fluid outlet.

16. The system of claim 1, wherein at least one of said plurality of screening cartridges comprises a first cartridge end and a second cartridge end at an opposite end thereof.

17. The system of claim 16, wherein said at least one exit port of said at least one of said plurality of screening cartridges is proximate said first cartridge end.

18. The system of claim 17, wherein said second cartridge end is a closed off end.

19. The system of claim 16, wherein said at least one exit port comprises at least two exit ports in fluid communication with an interior region of said at least one of said plurality of screening cartridges and said fluid outlet, and wherein a first of said at least two exit ports is proximate said first cartridge end and a second of said at least two exit ports is proximate said second cartridge end.

20. A vibratory separator system, comprising:
  a container comprising a fluid outlet, wherein said container is adapted to receive a material to be separated, and said material to be separated comprises at least a fluid and solid materials mixed therein;
  a box operatively coupled to said container;
  a vibrator apparatus operatively coupled to said box, wherein said vibrator apparatus is adapted to vibrate said box so as to separate at least some of said solid materials from said fluid;
  a vibratory isolation apparatus adapted to operatively couple said box to said container so as to substantially isolate said container from said vibration of said box; and
  a plurality of screening cartridges operatively couple to an inside of said box, wherein each of said plurality of screening cartridges comprises an interior cartridge region and at least one fluid exit port proximate one end thereof, wherein each of said plurality of screening cartridges is adapted to be vibrated with said box and to permit at least a portion of said fluid to flow from said box to said interior cartridge region, and wherein at least one of said fluid exit ports is adapted to permit a flow of said at least said portion of said fluid to said fluid outlet.

21. The vibratory separator system of claim 20, wherein each of said plurality of screening cartridges comprises a substantially cylindrical shape.

22. The vibratory separator system of claim 21, wherein each of said plurality of screening cartridges is arranged in a substantially horizontal orientation.

* * * * *